United States Patent
Shimizu

(10) Patent No.: US 7,140,459 B2
(45) Date of Patent: Nov. 28, 2006

(54) VEHICLE DRIVING FORCE CONTROL APPARATUS

(75) Inventor: Kouichi Shimizu, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 168 days.

(21) Appl. No.: 10/635,497

(22) Filed: Aug. 7, 2003

(65) Prior Publication Data

US 2004/0040758 A1    Mar. 4, 2004

(30) Foreign Application Priority Data

Aug. 27, 2002    (JP)    .............................. 2002-247551

(51) Int. Cl.
B60K 6/04    (2006.01)

(52) U.S. Cl. ..................... 180/65.2; 180/197; 180/243; 701/22; 701/69; 701/70

(58) Field of Classification Search ............... 180/65.2, 180/65.3, 65.4, 65.5, 243, 242, 244, 197; 701/22, 70, 69, 71, 73, 74, 75, 81, 82, 84, 701/85, 86, 89, 90, 91
See application file for complete search history.

(56) References Cited

U.S. PATENT DOCUMENTS

| 3,205,966 | A | * | 9/1965 | Landers ...................... 180/65.4 |
| 3,421,596 | A | * | 1/1969 | Livezey et al. ............. 180/243 |
| 3,994,354 | A |   | 11/1976 | Haumaier |
| 5,343,971 | A | * | 9/1994 | Heidelberg et al. ......... 180/65.4 |
| 5,415,245 | A | * | 5/1995 | Hammond ................... 180/165 |
| 5,839,535 | A | * | 11/1998 | Arai ............................ 180/197 |
| 6,266,602 | B1 |   | 7/2001 | Yamaura |
| 6,295,487 | B1 | * | 9/2001 | Ono et al. ..................... 701/22 |
| 6,434,469 | B1 |   | 8/2002 | Shimizu et al. |
| 6,442,454 | B1 |   | 8/2002 | Akiba et al. |
| 6,575,870 | B1 | * | 6/2003 | Kitano et al. ................... 477/3 |
| 6,902,511 | B1 | * | 6/2005 | Shimizu et al. ................ 477/4 |
| 6,904,991 | B1 | * | 6/2005 | Barth et al. .................. 180/197 |
| 6,962,550 | B1 | * | 11/2005 | Kadota ......................... 477/15 |
| 2001/0017225 | A1 |   | 8/2001 | Yamamoto et al. |
| 2003/0010559 | A1 |   | 1/2003 | Suzuki |
| 2003/0064858 | A1 |   | 4/2003 | Saeki et al. |
| 2003/0089539 | A1 |   | 5/2003 | Kadota |
| 2003/0151381 | A1 |   | 8/2003 | Kadota et al. |

FOREIGN PATENT DOCUMENTS

| EP | 0724979 A | 8/1996 |
| EP | 1108606 A | 6/2001 |

(Continued)

Primary Examiner—Christopher P. Ellis
Assistant Examiner—John Walters
(74) Attorney, Agent, or Firm—Global IP Counselors, LLP

(57) ABSTRACT

A vehicle driving force control apparatus is provided for a vehicle having a drive source configured to drive a generator and an electric motor configured to drive an electric motor driven wheel by electricity from the generator. The vehicle driving force control apparatus basically has a driving force detection section and a driving force control section. The driving force detection section is configured to detect at least one of a requested acceleration amount and a vehicle traveling speed. The driving force control section is configured to set a target generator driving force from the drive source based on at least one of the requested acceleration amount and the vehicle traveling speed. The vehicle driving force control apparatus is configured to provide a batteryless electric motor four-wheel drive vehicle that can ensure stability when starting from a stop on a low friction coefficient road, while maintaining vehicle acceleration performance.

14 Claims, 16 Drawing Sheets

(a)

(b)

FOREIGN PATENT DOCUMENTS

| | | |
|---|---|---|
| EP | 1110786 A | 6/2001 |
| JP | 2000-008902 A | 1/2000 |
| JP | 2000-168405 A | 6/2000 |
| JP | 2000-233739 A | 8/2000 |
| JP | 2000-318472 A | 11/2000 |
| JP | 2001-138764 A | 5/2001 |
| JP | 2001-177909 A | 6/2001 |
| JP | 2001-239852 A | 9/2001 |
| JP | 2002-235576 A | 11/2001 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

\* cited by examiner (a)

(b)

VEHICLE DRIVING FORCE CONTROL APPARATUS

BACKGROUND OF THE INVENTION

1. Field of the Invention

The present invention relates to a vehicle driving force control apparatus for a four-wheel drive vehicle capable of driving the main drive wheels by an internal combustion engine, and driving the subordinate drive wheels by an electric motor. More particularly, the present invention relates to a driving force control apparatus for a so-called batteryless four-wheel drive vehicle where the internal combustion engine drives a generator that supplies the generated electric power to the electric motor.

2. Background Information

An example of a driving force control apparatus for a batteryless four-wheel drive vehicle is disclosed in Japanese Laid-Open Patent Application No. 2000-318472. The driving force control apparatus of this publication is constituted so that, in a range below a predetermined traveling speed set to, for example, approximately 15 km/h, an electric motor is driven when the speed differential between the front and rear wheels reaches or exceeds a predetermined value, i.e., when the acceleration slippage reaches or exceeds a predetermined value. The electric motor is driven in accordance with an accelerator position opening degree. For example, when the accelerator position opening degree is in a range greater than or equal to a predetermined value, a fixed distribution amount of the engine output is used as the driving force for the generator, and the electric power generated by that driving force is supplied to the electric motor, which drives the subordinate drive wheels.

In view of the above, it will be apparent to those skilled in the art from this disclosure that there exists a need for an improved driving force control apparatus. This invention addresses this need in the art as well as other needs, which will become apparent to those skilled in the art from this disclosure.

SUMMARY OF THE INVENTION

Nevertheless, in the abovementioned conventional driving force control apparatuses of four-wheel drive vehicles, sufficient acceleration may not be obtained because, for example, a fixed distribution amount of the engine output, in a range wherein the accelerator position opening degree is greater than or equal to a predetermined value, is used as the driving force for the generator. In other words, the loss incurred when converting the engine output to electric energy, and the loss further incurred when converting that electric energy to the driving force of the subordinate drive wheels, reduces the driving force of the vehicle as a whole, and sufficient acceleration cannot be obtained when, for example, the road surface coefficient of friction is high and the driver demands a large acceleration.

In light of the abovementioned problems, the object of the present invention is to provide a driving force control apparatus for a four-wheel drive vehicle that can ensure stability when starting from a stop, while maintaining vehicle acceleration performance.

Thus, according to the present invention, a vehicle driving force control apparatus is provided for a vehicle having a drive source configured to drive a generator and an electric motor configured to drive an electric motor driven wheel by electricity from the generator. The vehicle driving force control apparatus basically comprises a driving force detection section and a driving force control section. The driving force detection section is configured to detect at least one of a requested acceleration amount and a vehicle traveling speed of the vehicle. The driving force control section is configured to set a target generator driving force from the drive source based on at least one of the requested acceleration amount and the vehicle traveling speed detected by the driving force detection section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
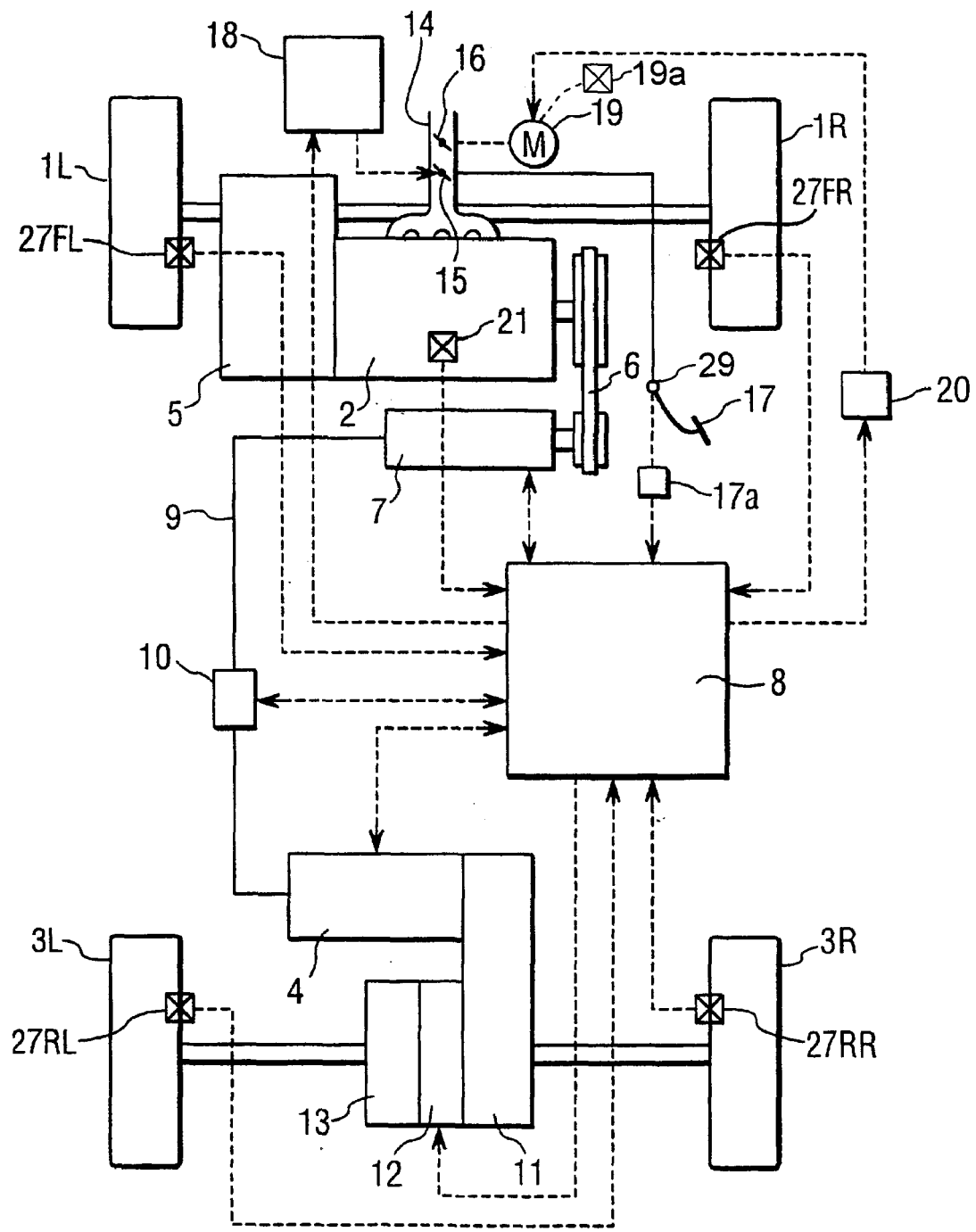
FIG. 1 is a schematic block diagram of a vehicle equipped with a vehicle driving force control apparatus in accordance with a first embodiment of the present invention.

Referring initially to FIG. 1, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. The vehicle is capable of four-wheel drive in which the left and right front wheels 1L and 1R are driven by an internal combustion engine or main drive source 2 and the left and right rear wheels 3L and 3R are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4. As shown in the FIG. 1, the engine output torque Te of the internal combustion engine 2 is transferred to the left and right front wheels 1L and 1R through a transmission and a differential gear 13. A portion of the engine output torque Te of the engine 2 is transferred to a generator 7 using an endless drive belt 6.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

The driving force control apparatus of the present invention is configured and arranged so that the generator 7 is driven by the internal combustion engine 2 and the generated electric power is supplied to the electric motor 4. The target generator driving force from the internal combustion engine 4 is preferably set in accordance with the amount of acceleration demanded by the driver or in accordance with the traveling speed of the subject vehicle. Therefore can reduce energy conversion losses while ensuring acceleration performance by limiting the target generator driving force to a small amount when a large amount of acceleration is demanded when on a road surface having a high coefficient of friction, or when the traveling speed of the subject vehicle is high. In addition, stability when starting from a stop can be ensured when traveling on a road surface having a low coefficient of friction if a comparison is made with the target generator driving force in accordance with the accelerator slippage, and the larger of the target generator driving forces is used. In addition, the target generator driving force can be compared with the target generator driving force set in accordance with the acceleration slippage, and the larger of the target generator driving forces may be used as discussed below.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor. The accelerator sensor 29 also constitutes a driving force detection section that is configured to detect a requested acceleration amount by the driver. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The throttle sensor 19a also constitutes a driving force detection section that is configured to detect a requested acceleration amount. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

Figure 2:
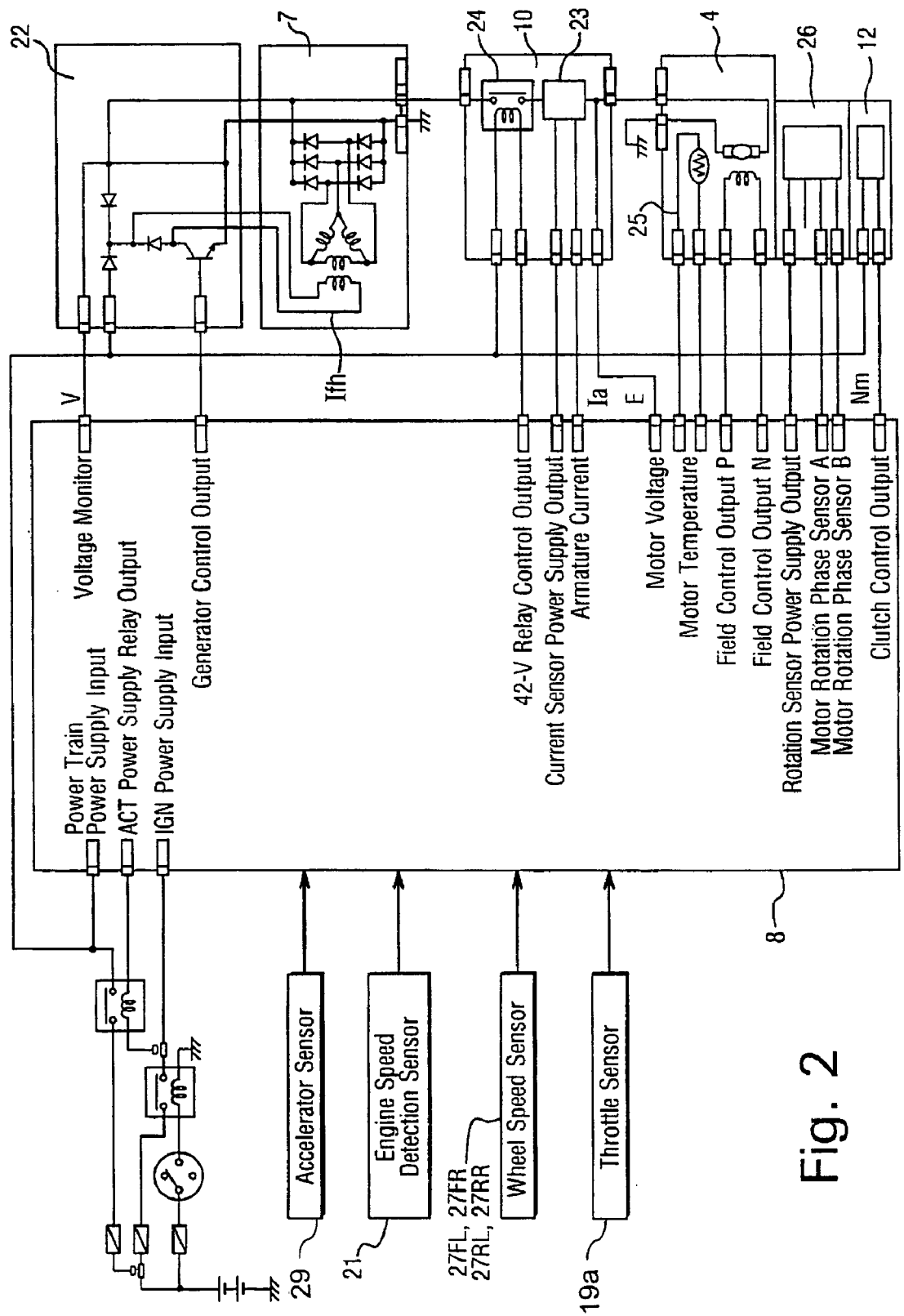
FIG. 2 is a block diagram of a control system for the vehicle driving force control apparatus in accordance with the first embodiment of the present invention.

As shown in FIG. 2, the generator 7 is equipped with a voltage adjusting device 22 (regulator) for adjusting the output voltage V. The generation load torque Th against the engine 2 and the generated voltage V are controlled by the adjustment of field current Ifh executed by the 4WD controller 8. The voltage adjusting device 22 receives a generator control command (field current value) from the 4WD controller 8 and adjusts the field current Ifh of the generator 7 to a value corresponding to the generator control command. It is also capable of detecting the output voltage V of the generator 7 and outputting the detected voltage value to the 4WD controller 8. Additionally, the rotational speed Nh of the generator 7 can be computed based on the rotational speed Ne of the engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

A control command from the 4WD controller 8 controls the field current Ifm of the electric motor 4. Thus, the adjustment of the field current Ifm by the 4WD controller 8 adjusts the drive torque Tm of the electric motor 4. By reducing the field current Ifm of the electric motor 4, once the armature voltage is reached, the rotational speed of the electric motor 4 can be increase. A thermistor 25 measures the temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12. Moreover, each speed sensor 27FL, 27FR, 27RL, and 27RR also constitutes or functions as a driving force detection section that is configured to detect a vehicle traveling speed of the vehicle.

Figure 3:
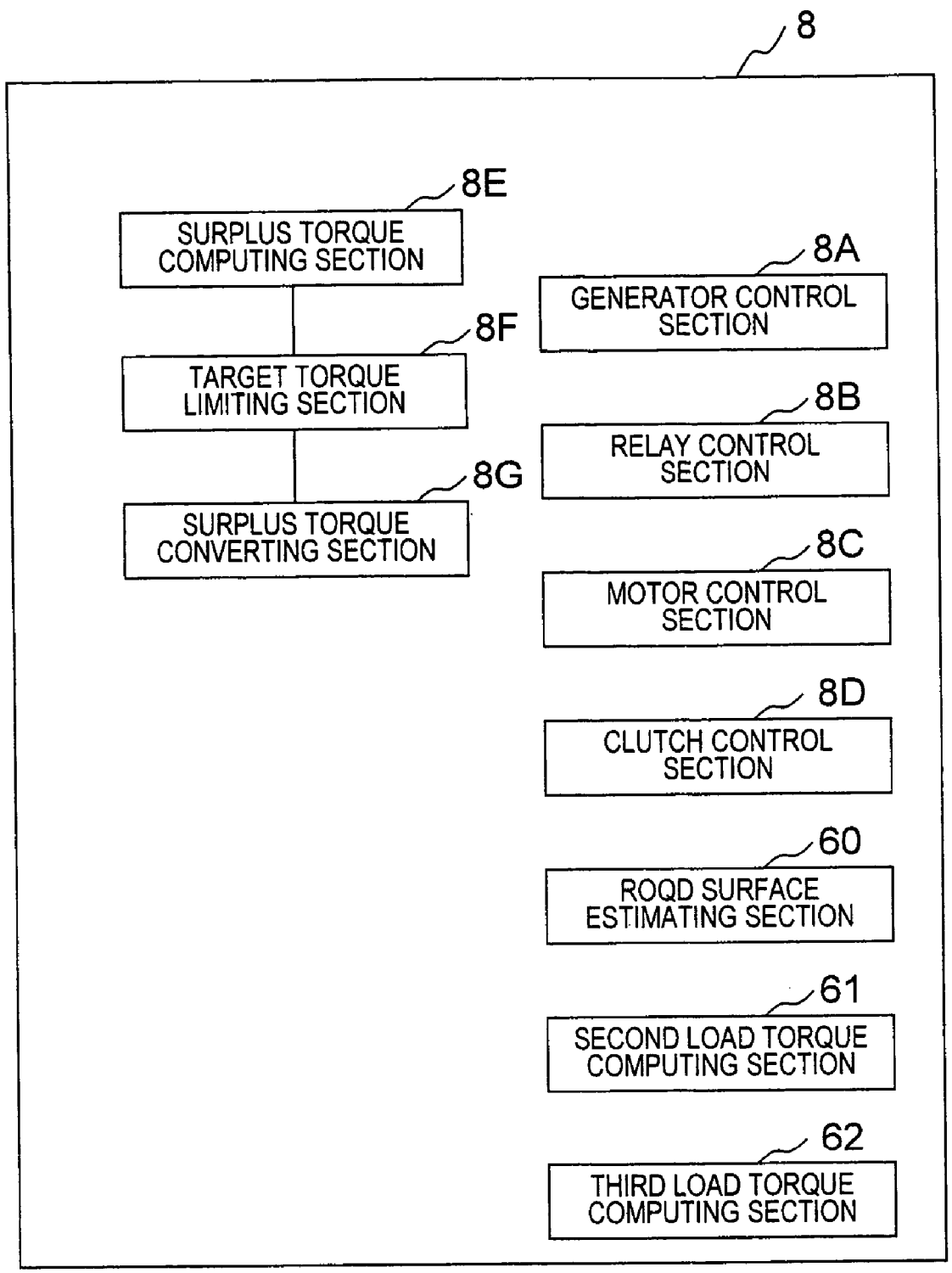
FIG. 3 is a block diagram illustrating the 4WD controller for the vehicle driving force control apparatus in accordance with the first embodiment of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, and a surplus torque converting section 8G.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the voltage adjusting device 22, the generator control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section as discussed below. The relay control section 8B controls shutting off and connecting the power supply from the generator 7 to the electric motor 4. The motor control section 8C adjusts the field current Ifm of the electric motor 4 in order to adjust the torque of the electric motor 4 to the required value.

The clutch control section 8D controls the state of the clutch 12 by outputting a clutch control command to the clutch 12. The clutch control section 8D constitutes the clutch engagement control section of the present invention.

Figure 4:
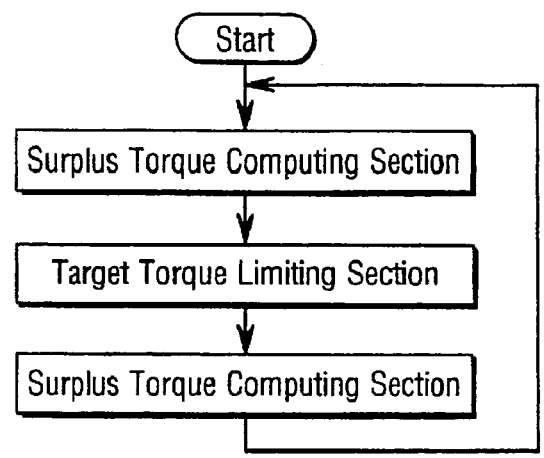
FIG. 4 is a flow chart showing the processing procedure executed by the 4WD controller for the vehicle driving force control apparatus of the first embodiment of the present invention.

As shown in FIG. 4, at a prescribed sampling time cycle, the 4WD controller 8 executes the processing of the surplus torque computing section 8E, the target torque limiting section 8F, and the surplus torque converting section 8G in sequence based on the input signals. Together, the drive mode selection section 8K, the surplus torque computing section 8E, the target torque limiting section 8F, and the surplus torque converting section 8G constitute an output torque control section of the 4WD controller 8.

Figure 5:
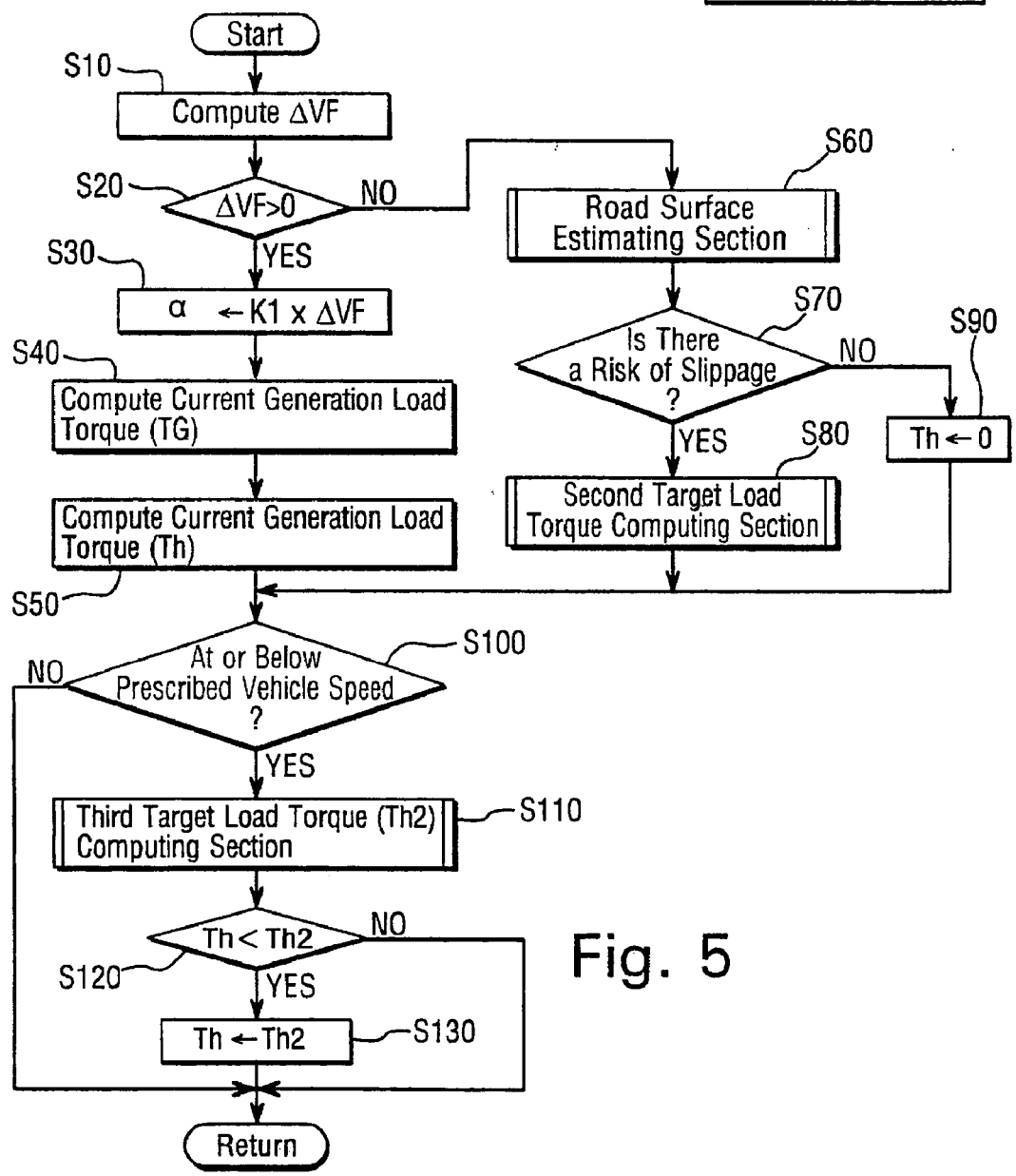
FIG. 5 is a flow chart showing the processing executed by the surplus torque computing section for the vehicle driving force control apparatus of the first embodiment of the present invention.

Next, the surplus torque computing section 8E will be discussed which executes the processing shown in FIG. 5. The surplus torque computing section 8E constitutes a driving force control section for the target generator torque Th of the generator 7.

First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed $\Delta VF$, which is the magnitude of the acceleration slippage of the front wheels 1L and 1R. Then, the 4WD controller 8 proceeds to step S20.

An example of computing the slip speed $\Delta V_F$ will now be explained. The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf} = (V_{Wfl} + V_{Wfr})/2 \quad (1)$$

$$V_{Wr} = (V_{Wrl} + V_{Wrr})/2 \quad (2)$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (3):

$$\Delta V_F = V_{Wf} - V_{Wr} \quad (3)$$

If the 4WD controller 8 determines that the slip speed $\Delta V_F$ is less than or equal to zero, it is presumed that there is no acceleration slippage in the front wheels 1L and 1R, and processing proceeds to step S60.

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the engine 2. If slippage speed $\Delta V_F$ is determined to be zero or below, it is estimated that the front wheels 1L and 1R are not experiencing acceleration slippage and processing proceeds to step S60.

Conversely, if in step S20 slippage speed $\Delta V_F$ is determined to be larger than zero, it is estimated that the front wheels 1L and 1R are experiencing acceleration slippage and thus control proceeds to step S30.

Figure 6:
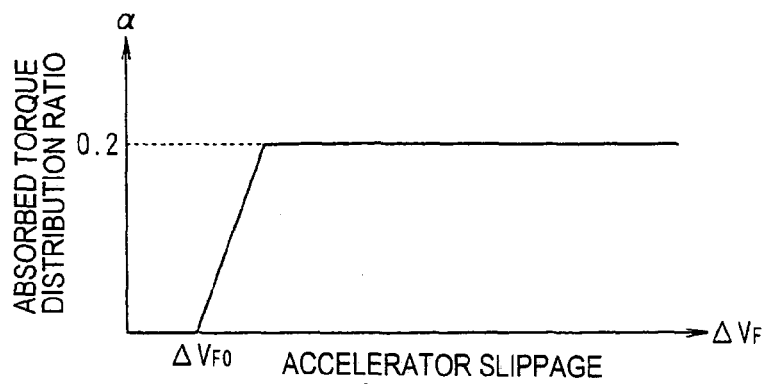
FIG. 6 is a control map used in the computational processing executed by the surplus torque computing section of FIG. 5 for the vehicle driving force control apparatus of the first embodiment of the present invention.

In step S30, an absorbed torque distribution ratio α needed to suppress acceleration slippage of the front wheels 1L and 1R is computed based on, for example, the control map shown in FIG. 6, and the absorbed torque $T\Delta V_F$ is computed by multiplying the absorbed torque distribution ratio α by the engine output torque Te. The absorbed torque distribution ratio α can also be referred to as the generation load torque distribution ratio. Processing then proceeds to step S40. In the control map of FIG. 6, the abscissa is the acceleration slippage $\Delta V_F$, the ordinate is the absorbed torque distribution ratio α, and the absorbed torque distribution ratio α increases linearly at greater than microslippage $\Delta V_{F0}$. The values of the absorbed torque distribution ratio α and the absorbed torque $T\Delta V_F$ in this range are computed by the Equation (4) below.

$$T\Delta V_F = Te \times \alpha = K1 \times \Delta V_F \quad (4)$$

where: K1 is a gain that is found through experimentation or the like.

Further, step S30 constitutes, in the present invention, a generator driving force computing section corresponding to the acceleration slip.

In addition, the absorbed torque distribution ratio α is limited to a predetermined ratio (herein, 20%, or 0.2). Accordingly, the upper limit of the absorbed torque $T\Delta V_F$ is 0.2×Te.

In step S40, a current load torque TG of the generator 7 is calculated based on the Equation (5) below, and then the 4WD controller 8 proceeds to step S50.

$$TG = K2 \frac{V \times Ia}{K3 \times Nh} \quad (5)$$

where: V: voltage of the generator 7,

Ia: armature current of the generator 7,

Nh: rotational speed of the generator 7,

K3: efficiency, and

K2: coefficient.

In step S50, the surplus torque, i.e., the target generator load torque Th that the generator 7 should impose, is found based on the Equation (6) stated below. Then, the processing executed by the 4WD controller 8 proceeds to step S100.

$$Th = TG + T\Delta V_F \quad (6)$$

Meanwhile, if the main drive wheels 1L and 1R are determined not to be experiencing acceleration slippage in step S20, then processing proceeds to step S60 where the road surface estimating section 60 is started, and an estimation is executed of whether or not the road surface is such that there is an apprehension of acceleration slippage occurring. Then, processing proceeds to step S70.

In step S70, a determination is executed as to whether there is an apprehension of acceleration slippage occurring. Processing is directed to step S80 when, based on the estimation of the road surface estimating section 60, the AS-FLG is ON. In other words, processing is directed to step S80 when, it was determined that the road surface is such that there is an apprehension of acceleration slippage occurring. Meanwhile, processing is directed to step S90 when the AS-FLG is OFF, i.e., it was determined that there is no apprehension of acceleration slippage. Zero is assigned as the target generation load torque Th and processing proceeds to step S80.

In step S80, the second target load torque computing section 61 is activated and calculates the target generation load torque Th, which is used to set the target drive torque of the subordinate drive wheels 3L and 3R to the required value. Thus, steps S70 and S80 constitute an acceleration slip target generator driving force computing section. Then, processing proceeds to step S100.

In step S100, the control program determines whether or not the vehicle speed is at or below a prescribed vehicle speed, e.g., at or below 3 km/h. Thus, step S100 constitutes a low speed condition determining section. If the control program determines that the vehicle speed is at or below the prescribed speed, then processing proceeds to step S110. If the vehicle speed is determined to be faster than the prescribed speed, then processing ends and returns to the beginning of the control program to repeat the control program after a prescribed sampling time cycle has expired. Furthermore, the abovementioned predetermined speed is the speed at which the vehicle is determined to have started from a stop.

In step S110, the third target load torque computing section 62 is activated and calculates a second target generation load torque Th2 Processing then proceeds to step S120. The third target load torque computing section 62 computes and sets a third target generation load torque distribution ratio $\alpha 1$ in accordance with, for example, the control map shown in FIG. 7a. The third target load torque computing section 62 calculates and sets the second target generation load torque Th2 by multiplying that third target generation load torque distribution ratio $\alpha 1$ by the engine output torque Te. When the accelerator position opening degree (which is detected by the accelerator sensor or throttle sensor as the amount of acceleration demanded by the driver) is assigned to APO in the control map, a second target generation load torque distribution ratio $\alpha 2$ increases linearly as the accelerator position opening degree APO increases in the range from the comparatively small predetermined value $APO_1$ to the larger predetermined value $APO_2$. In addition, the distribution ratio $\alpha 2$ is limited to a predetermined ratio (herein, 20%, or 0.2) in the range from the predetermined value $APO_2$ to the predetermined value $APO_3$. The predetermined value $APO_3$ indicates the upper limit of the accelerator position opening degree range generally used by a driver. Furthermore, the second target generation load torque distribution ratio $\alpha 2$ sharply decreases linearly as the accelerator position opening degree APO increases in the range from the predetermined value $APO_3$ to the predetermined value $APO_4$. Furthermore, the second target generation load torque distribution ratio $\alpha 2$ decreases at a slow rate as the accelerator position opening degree APO increases in the range beyond the predetermined value $APO_4$.

Thus, the 4WD controller 8 includes a first generator load torque generator control section in steps S10–S50 that calculates a first target generation load torque Th of the generator 7 in accordance with the acceleration slippage magnitude of the main drive wheels 1L and 1R when acceleration slippage of the main drive wheel 1L and 1R is estimated to be occurring acceleration slippage and when the low speed condition determining section (step S100) determines that the vehicle is in a low speed condition.

In step S120, the target generation load torque Th corresponding to the acceleration slippage and the second target generation load torque Th2 are compared. If the second target generation load torque Th2 is determined to be larger, then the value of the second target generation load torque Th2 is assigned to the target generation load torque Th in step S130 and processing returns to repeat the looped sequence. Otherwise, processing ends and returns to the beginning of the control program to repeat the control program after a prescribed sampling time cycle has expired.

In the present embodiment, processing is performed by selecting the larger of the target generation load torque Th, corresponding to the acceleration slip, and the second target generation load torque Th2 based on a low-speed state less than or equal to a predetermined speed. However, in a low-speed state less than or equal to a predetermined speed, it is acceptable to unconditionally assign the second target generation load torque Th2 to the target generation load torque Th.

Figure 8:
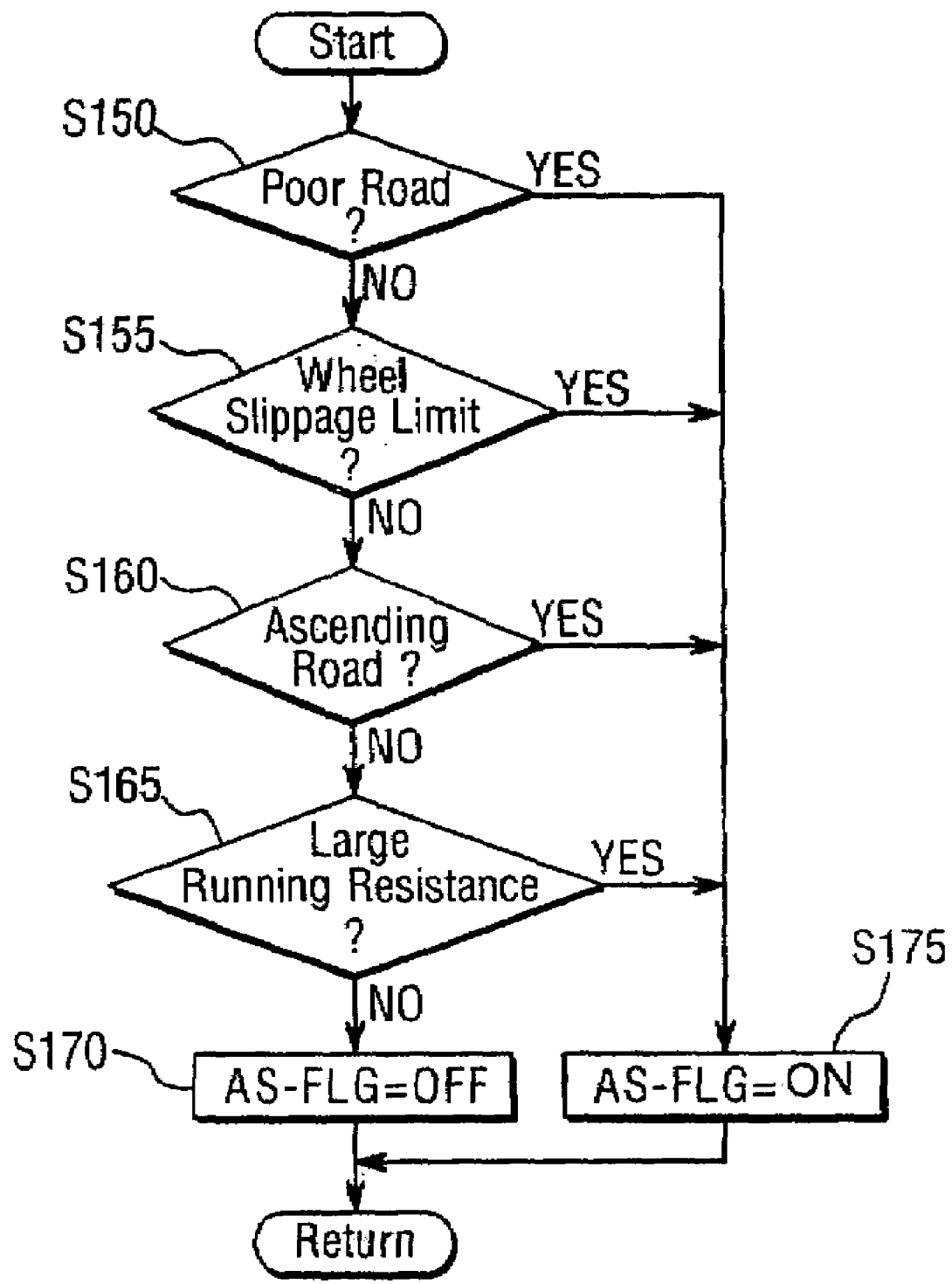
FIG. 8 is a flow chart showing the processing executed by the road surface estimating section for the vehicle driving force control apparatus of the first embodiment of the present invention.

Next, the processing of the road surface estimating section 60 will be explained using FIG. 8. The road surface estimating section 60 is configured to form an acceleration slippage apprehension estimating device or section. The road surface estimating section 60 is configured and arranged to compute a road surface condition including, but not limited to, a poor road condition estimate to determine if detected road surface conditions are within a prescribed poor road range, a wheel grip limit estimation value for the front drive wheel 1L and 1R, an ascending road estimate to determine if the vehicle is traveling on an ascending road, and a running resistance of the vehicle.

In step S150, the road surface estimating section 60 estimates whether or not the current road surface condition is poor. In other words, the road surface estimating section 60 acts as a poor road estimating section that is configured to estimate if detected road conditions are within a prescribed poor road range.

If the road condition is estimated to be poor, processing proceeds to step S175. If the road condition was not estimated to be poor, then processing proceeds to step S155, where the road surface estimating section 60 estimates whether or not the road surface condition is in the vicinity of the wheel grip limit. If it is estimated that the road surface condition is in the vicinity of the wheel grip limit, then processing proceeds to step S175. If not, then processing proceeds to step S160, where the road surface estimating section 60 estimates whether or not the vehicle is travelling on an ascending road whose grade exceeds a prescribed grade. If the road is estimated to be an ascending road whose grade exceeds a prescribed grade, then processing proceeds to step S175. If not, then processing proceeds to step S165, where the control program determines whether the running resistance exceeds a prescribed resistance due to travelling on sandy terrain, a snowy road surface, or the like, then processing proceeds to step S175. If not, then processing proceeds to step S170.

In step S175, the AS-FLG, which indicates that the road surface is such that there is an apprehension of acceleration slippage, is set to ON because the road surface is in the vicinity of the wheel grip limit, is an ascending road, or has a running resistance that exceeds a prescribed resistance. Processing then returns to the looped sequence.

In step S170, the AS-FLG flag is set to OFF because the road surface condition is different from the road surface conditions above. Processing then returns to the looped sequence.

As explained above, the preceding explanation describes determining if the road conditions matched any one of four different types. However, it is also acceptable to estimate other road conditions for which there is an apprehension of acceleration slippage occurring or to estimate only a portion of the aforementioned four types of road condition.

Figure 9:
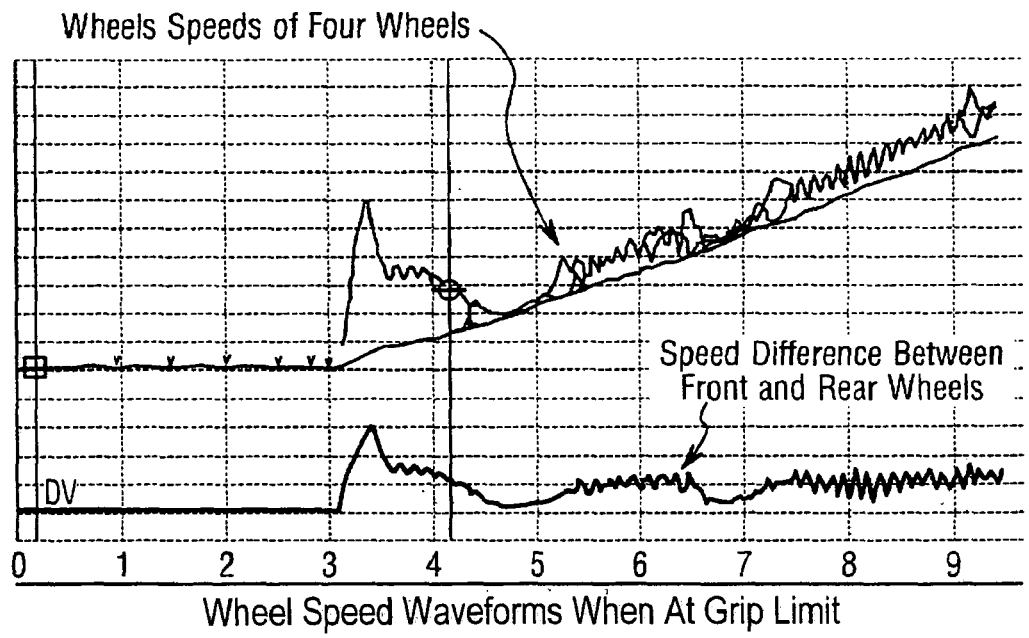
FIG. 9 is a graph showing the vehicle wheel speed waveforms when at the slippage or grip limit.
Figure 10:
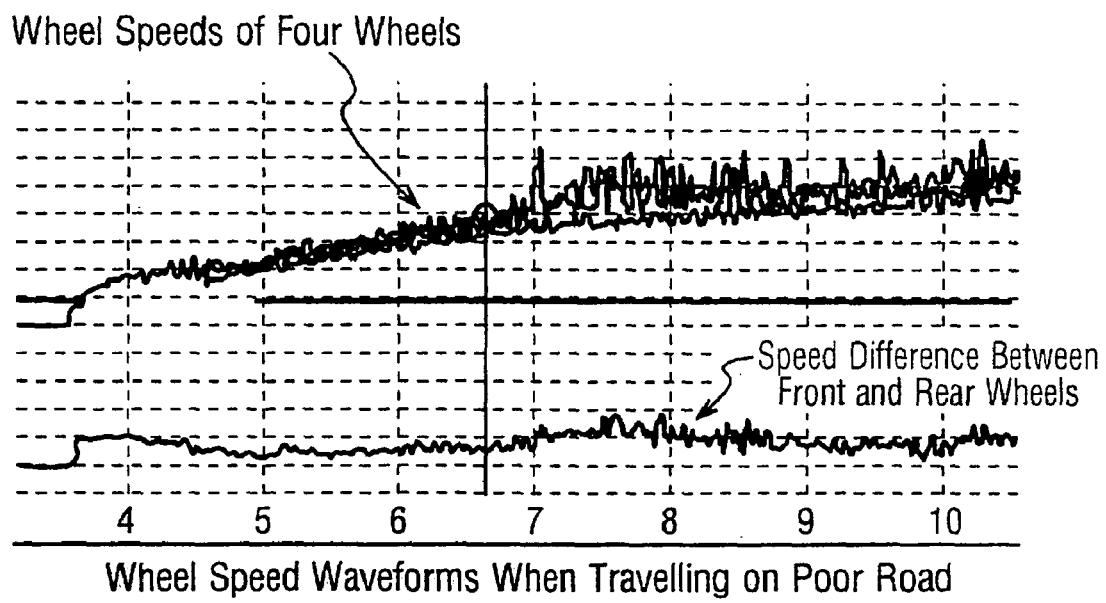
FIG. 10 is a graph showing the vehicle wheel speed waveforms when travelling on a poor road.

In this embodiment, the estimations for poor road and road surface in the vicinity of the wheel grip limit are conducted as follows. The wheel speed waveform shown in FIG. 9 is used when travelling on a road surface that is in the vicinity of the grip limit, while the wheel speed waveform shown in FIG. 10 is used when travelling on a poor road. According to these waveforms, the wheel speed shows an oscillation with a frequency of approximately 8 Hz when the vehicle is travelling on a road surface in the grip limit vicinity and approximately 11 Hz when the vehicle is travelling on a poor road. Although these frequencies have a variance of ±2 Hz, they are unique to the vehicle. Therefore, by experimentally measuring the frequency when at the grip limit and the frequency when travelling on a poor road for the particular vehicle, it can be determined when the vehicle is travelling at the grip limit or on a poor road by focusing on these frequency bands. Technologies for determining the travelling condition of a vehicle based on a specified frequency band are presented in Japanese Laid-Open Patent Publication No. 2000-233739, etc. The threshold value of the oscillation level used for making the determination should be a value that sufficiently avoids the background noise level in a case of either of the two road surface conditions. Therefore, the same degree of frequency band should be used for both the grip limit determination and the poor road determination. Additionally, instead of finding the oscillation frequency when at the grip limit and the oscillation frequency when travelling on a poor road for the particular vehicle experimentally, the unsprung resonance frequency of the drive shaft ±2 Hz can be used as the oscillation frequency for the grip limit and the unsprung resonance frequency of the suspension ±2 Hz can be used as the frequency band for travelling on a poor road.

Therefore, based on the facts just presented, the determination of whether the vehicle is travelling on a poor road or on a road surface that is at the grip limit is accomplished by passing the wheel speed signals through a band pass filter, differentiating the same with a differentiator, and determining if the absolute value is greater than or equal to a prescribed threshold value (e.g., 2G). The following frequency bands should be used as the band region of the aforementioned band pass filter in the cases shown in FIGS. 7 and 8, for example: the frequency band from 6 to 10 Hz should be used for detecting a grip limit road surface; the frequency band from 9 to 13 Hz should be used for detecting a poor road; and the frequency band from 6 to 13 Hz should be used when detecting both.

Furthermore, the determination of whether or not the vehicle is on an ascending road can be accomplished based on the ascent resistance. More specifically, it can be determined if the road is ascending at a grade that exceeds a prescribed grade by installing a G sensor that measures the acceleration force that acts on the vehicle in the vertical direction with respect to the road surface and estimating the grade of the road surface based on the output Gv from this G sensor. In this case, $Gv=g \times \sin \theta$ (where g represents the gravitational acceleration and $\theta$ represents the road surface grade) and ascent resistance $R=g \times \cos \theta$.

An ascending road can also be estimated based on the actual slant of the vehicle body. The estimation of whether or not the running resistance is greater than or equal to a prescribed value can be accomplished using a known technology, such as that disclosed in Japanese Laid-Open Patent Publication No. 2000-168405. For example, the estimation can be conducted as follows. First, the acceleration Ar of the subordinate drive wheels 3L and 3R is calculated and then the product of the acceleration Ar and the vehicle weight W is calculated to obtain the vehicle acceleration part driving force Fa ($=Ar \times W$). Meanwhile, the four-wheel driving force Fw (sum of driving force of main drive wheels 1L and 1R and driving force of subordinate drive wheels 3L and 3R) is calculated. Then it can be estimated if the running resistance exceeds a prescribed value by determining if the running resistance force Fs, which is the difference between the vehicle acceleration part driving force Fa and the four-wheel driving force Fw, exceeds a prescribed threshold value (e.g., 980 N).

Figure 11:
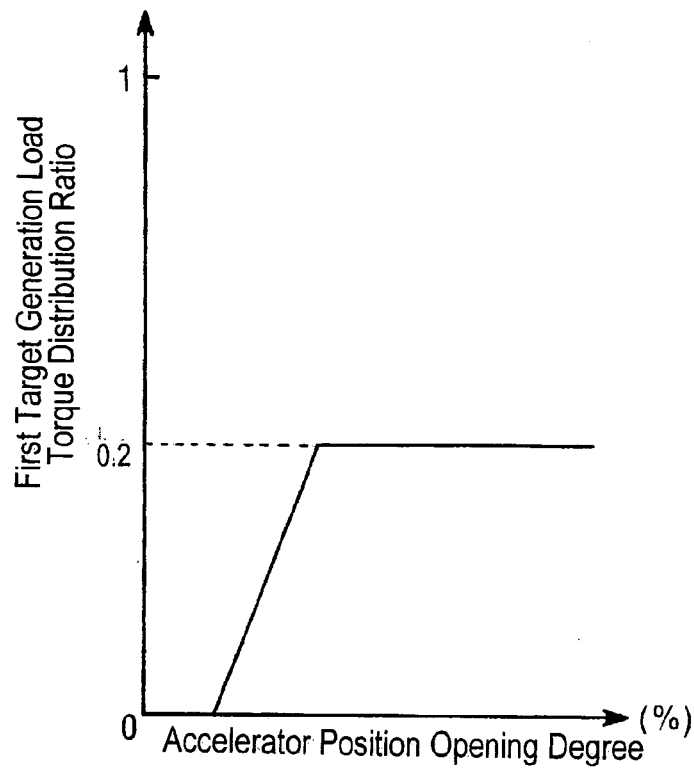
FIG. 11 is a graph showing the relationship between distribution ratio and the accelerator position.

Now, the processing executed by the second target load torque computing section 61 will be explained. First, the torque demanded by the driver (accelerator position opening degree) is estimated based on the amount of operation of the accelerator pedal or throttle opening, and the distribution ratio $\alpha 1$ for the generation load, which is proportional to the estimated demand torque, is determined based on a map such as shown in FIG. 11. Furthermore, the upper limit is set in advance to, for example, 20% (0.2). In addition, the engine output torque Te is derived based on the engine rotational speed sensor 21 and the throttle sensor, and the like, and the target generation load torque Th is computed by multiplying the engine output torque Te by the distribution ratio $\alpha 1$. Furthermore, the distribution ratio $\alpha 1$ typically takes on a value like 0.1, where 1 is the entire engine torque.

Although here the distribution ratio $\alpha 1$ is set so as to vary in accordance with the requested torque of the driver, it is also acceptable to keep the ratio fixed or to vary it in a stepwise manner. Furthermore, it is also acceptable to find the road surface limit reaction force for a high-$\mu$ road (e.g., a road surface with a friction coefficient $\mu$ value between 0.7 and 1.0) in advance by experimentation and vary the distribution ratio $\alpha 1$ in accordance with the difference between the aforementioned road surface limit reaction force and the current road surface limit reaction force at the main drive wheels 1L and 1R. Thus, the second generator control section 61 is configured to control the torque of the generator 7 to match a generation load torque when the acceleration slippage apprehension estimating section estimates that there is an apprehension of acceleration slippage, the generation load torque being determined in accordance with a difference between the current road surface reaction force limit torque and a previously-calculated high-$\mu$ road surface reaction force limit torque.

Figure 12:
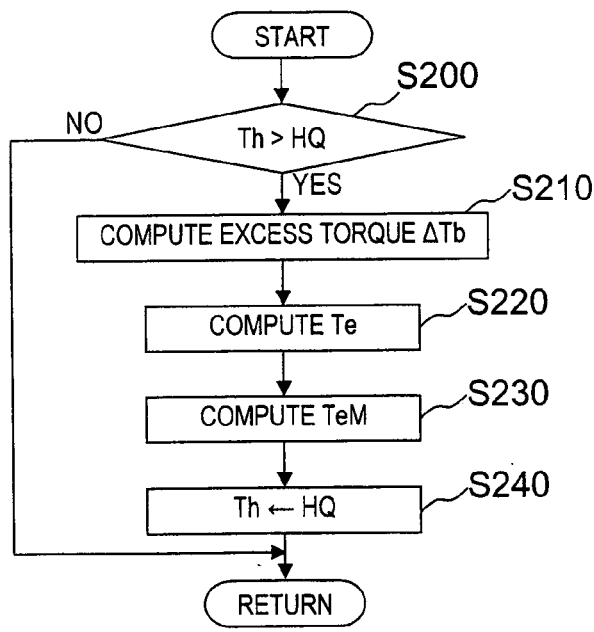
FIG. 12 is a flow chart showing the processing executed by the target torque limiting section for the vehicle driving force control apparatus of the first embodiment of the present invention.

Next, the processing executed by the target torque limiting section 8F will be explained based on FIG. 12. First, in step S200, the control program determines whether or not the target generation load torque Th is larger than the maximum load capacity HQ of the generator 7. Processing proceeds to the beginning of the control program to repeat the control program after a prescribed sampling time cycle has expired, if the control program determines that target generation load torque Th is less than or equal to the maximum load capacity HQ of the generator 7. Conversely, processing proceeds to step S210 if the control program determines that target generation load torque Th is larger than the maximum load capacity HQ of the generator 7.

In step S210, the excess or surplus torque $\Delta$Tb, which is the portion of target generation load torque Th that exceeds the maximum load capacity HQ, is found according to the following equation: $\Delta Tb=Th-HQ$. Then, processing proceeds to step S220.

In step S220, the current engine torque Te is computed based on the signals from the engine speed detection sensor 21 and the throttle sensor. Then, processing proceeds to step S230.

In step S230, the engine torque upper limit value TeM is calculated by subtracting the aforementioned excess or surplus torque $\Delta$Tb from the aforementioned engine torque Te, as set forth in the equation $TeM=Te-\Delta Tb$. After the engine torque upper limit value TeM is outputted to the engine controller 18, processing proceeds to step S240.

Without relation to operation of the accelerator pedal 17 by the driver, the engine controller 18 limits the engine torque Te such that the inputted engine torque upper limit value TeM becomes the upper limit value of engine torque Te. The processing from step S210 to this point comprises an internal combustion engine output limiting device or section.

In step S240, the maximum load capacity HQ is assigned as the target generation load torque Th and then processing returns to the beginning of the control program to repeat the control program after a prescribed sampling time cycle has expired.

Figure 13:
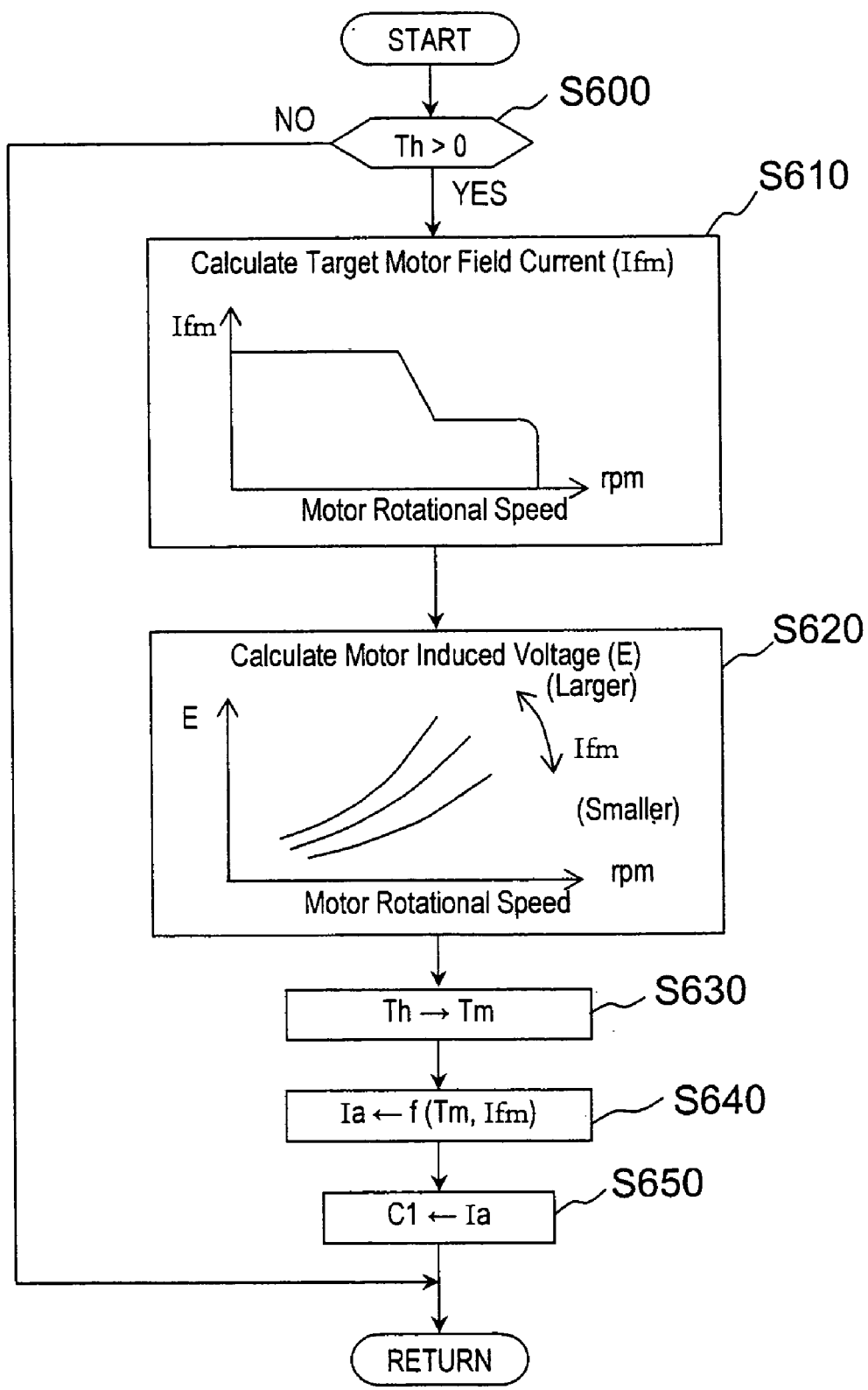
FIG. 13 is a flow chart showing the processing executed by the surplus torque converting section for the vehicle driving force control apparatus of the first embodiment of the present invention.

Next, the processing executed by the surplus torque converting section 8G will be explained based on FIG. 13. The surplus torque converting section 8G forms a generation load torque control section that is operatively coupled to the generation load torque adjusting section of the generator control section 8A to control the generation load torque of the generator 7 to a torque value based on the surplus torque computed by the surplus torque computing section 8E.

First, in step S600, the control program determines if Th is larger than zero. If Th is determined to be larger than zero, processing proceeds to step S610 because one of the following is occurring: the front wheels 1L and 1R are experiencing acceleration slippage; the conditions are such that there is an apprehension of acceleration slippage occurring; or the vehicle is in a low speed state at or below a prescribed speed. If the control program determines that Th is less than or equal to 0, then processing returns to the beginning of the control program to repeat the control program after a prescribed sampling time cycle has expired without executing the subsequent steps because the vehicle is in a state in which the front wheels 1L and 1R are not experiencing acceleration slippage or other comparable state.

In step S610, the rotational speed Nm of the electric motor 4 detected by motor speed sensor 26 is received as input. The target motor field current Ifm corresponding to the rotational speed Nm of the electric motor 4 is calculated and the target motor field current Ifm is outputted to the motor control section 8C. Then, processing proceeds to step S620.

In this embodiment, the target motor field current Ifm corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed (see FIG. 14). In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the motor induced voltage E is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S620, the induced voltage E of the electric motor 4 is calculated based on the target motor field current Ifm and the rotational speed Nm of the electric motor 4. Then, processing proceeds to step S630.

In step S630, the corresponding target motor torque Tm is calculated based on the generation load torque Th computed by the surplus torque computing section 8E. Then, processing proceeds to step S640.

In step S640, the corresponding target armature current Ia is calculated using the target motor torque Tm and the target motor field current Ifm as variables. Then, processing proceeds to step S650.

In step S650, the duty ratio C1 equivalent to the target current value Ia of the generator 7 is computed from the target armature current Ia. The duty ratio C1 of the generator 7 is then output to the generator control section 8A. The duty ratio C1 serves as a generator control command value. Processing returns to the beginning of the control program to repeat the control program.

Figure 14:
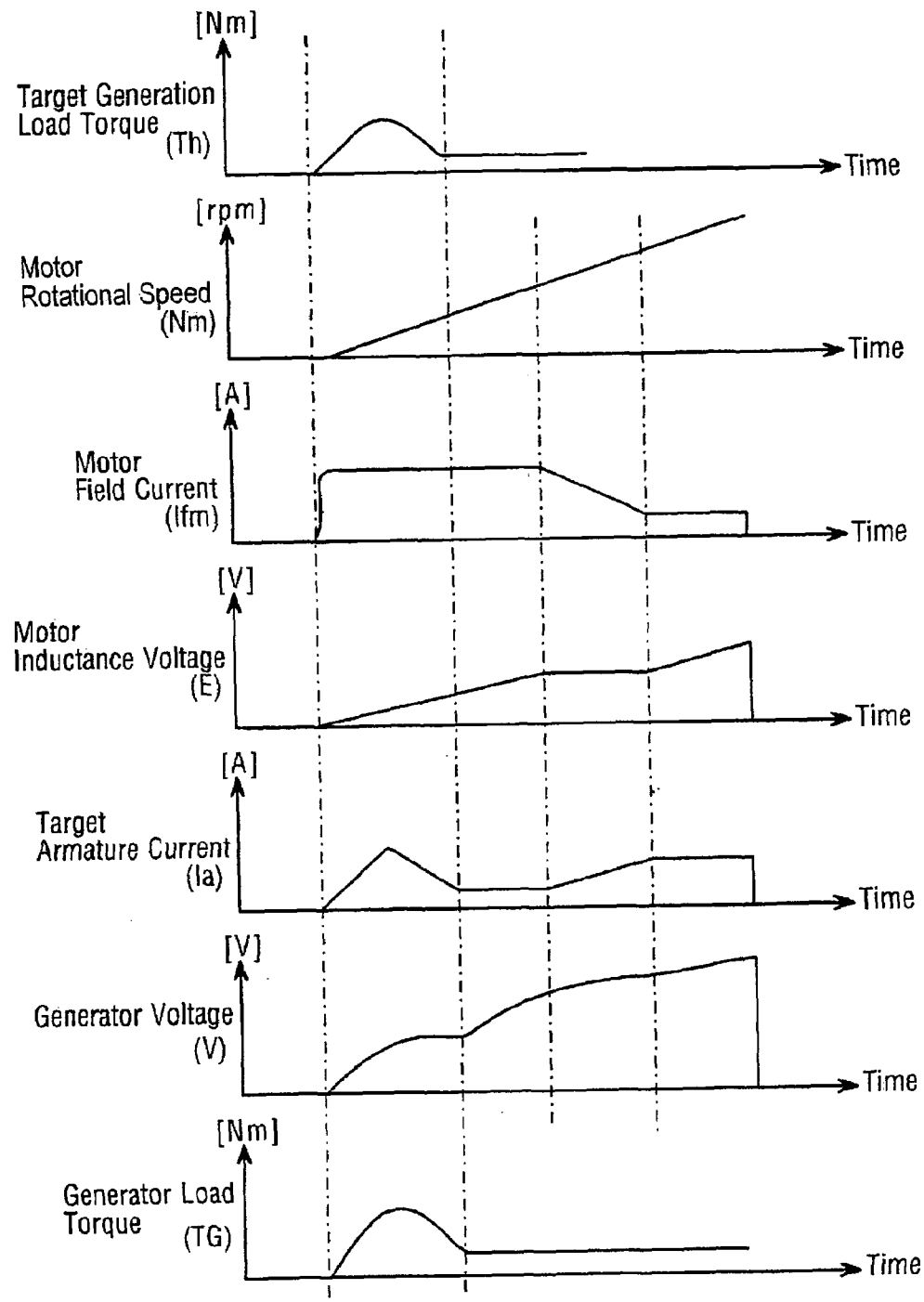
FIG. 14 are exemplary time charts for the surplus torque converting section for the vehicle driving force control apparatus of the first embodiment of the present invention.

In addition, FIG. 14 shows examples of time charts for the processing described above. In this embodiment, the steps S10 and S20 constitute a main drive wheel slippage estimating device or section. The generator control section 8A, which controls field current Ifh, constitutes a generation load torque adjusting device or section. The steps S30 to S50 constitute a surplus torque computing device or section. The surplus torque converting section 8G constitutes a generator load torque control device or section.

The following explains the operation of an apparatus constituted as described above. If the road surface reaction force limit torque becomes larger than the torque transmitted from the internal combustion engine 2 to the left and right front wheels 1L and 1R because of reasons like the road surface μ is small or the amount that the driver has depressed the accelerator pedal 17 is large, in other words, if the left and right front wheels 1L and 1R, which are the main drive wheels, are undergoing acceleration slip, the generator 7 generates electric power with a generation load torque Th corresponding to the amount of acceleration slippage, and thereby the drive torque transmitted to the front wheels 1L and 1R can be adjusted so that it approaches the road surface reaction force limit torque of the front wheels 1L and 1R. As a result, acceleration slip at the front wheels 1L and 1R, which are the main drive wheels, is suppressed.

Moreover, the surplus electric power generated by the generator 7 drives the electric motor 4, which also drives the rear wheels 3L and 3R (subordinate drive wheels), thereby improving the acceleration performance of the vehicle.

At the same time, the electric motor 4 is driven by the surplus torque beyond the road surface reaction force limit torque of the subordinate drive wheels 3L and 3R. Consequently, the energy efficiency is improved, which leads to improved fuel consumption.

In this embodiment, if the rear wheels 3L and 3R were always driven, several energy conversions (mechanical energy→electrical energy→mechanical energy, etc.) take place and energy losses occur in accordance with the conversion efficiencies. Therefore, the acceleration performance of the vehicle would decline in comparison with a case where only the front wheels 1L and 1R were driven. Consequently, it is generally preferred that driving of the rear wheels 3L and 3R be suppressed. Conversely, this embodiment takes into consideration the fact that when travelling on a slippery road surface or the like, even if all of the output torque Te of the engine 2 is transferred to the front wheels 1L and 1R, not all of the torque will be used as driving force. The driving force that can not be utilized efficiently by the front wheels 1L and 1R is outputted to the rear wheels 3L and 3R and the acceleration performance is improved.

Furthermore, in the present embodiment, even if the front wheels 1L and 1R (which are the main drive wheels) are not experiencing acceleration slippage but the road surface condition is estimated to be such that there is an apprehension of acceleration slippage occurring, a generation load torque is produced in advance and the vehicle is put into a four-wheel drive state to an extent that the vehicle remains stable. As a result, travel stability can be obtained reliably and the stability and response of the vehicle with respect to acceleration slippage are improved.

When the vehicle is starting to move or is otherwise in a low speed condition at or below a prescribed speed, there is the danger that the estimation of acceleration slippage will not be conducted appropriately regardless of whether the acceleration slippage is estimated using the difference in speed $\Delta V$ between the front and rear wheels or using the road surface reaction force limit torque. In other words, the precision of the acceleration slippage detection degrades when the speed is low because the precision of the wheel speed detection performed by rotary sensors and the like degrades and the road surface reaction force is too small due to the small acceleration of the vehicle. Thus, it is possible to have a situation where vehicle does not go into a four-wheel drive state even though acceleration slippage is actually occurring. Meanwhile, if acceleration slippage of the main drive wheels 1L and 1R occurs when on sandy terrain or a snowy road surface, the road surface contacted by the main drive wheels 1L and 1R will change and travelling conditions will worsen (e.g., road surface friction coefficient $\mu$ will decline and running resistance will increase). The lower the speed of the vehicle is, the larger the effect of the change in the road surface caused by the vehicle will be. In short, when the vehicle is starting to move or otherwise travelling at a very low speed, the occurrence of slippage will worsen the road surface condition and afterwards it will be difficult to start moving even if the vehicle goes into four-wheel drive.

In contrast, in the present embodiment, when the vehicle is starting to move or otherwise in a low speed state at or below a prescribed speed, the subordinate drive wheels 3L and 3R are driven in advance with a drive torque corresponding to the requested drive torque (acceleration request or the like) of the driver even before acceleration slippage occurs. As a result, stable starting and stable travel at low speeds can be achieved even when travelling on sandy terrain or other road surface for which acceleration slippage occurs easily.

Figure 15:
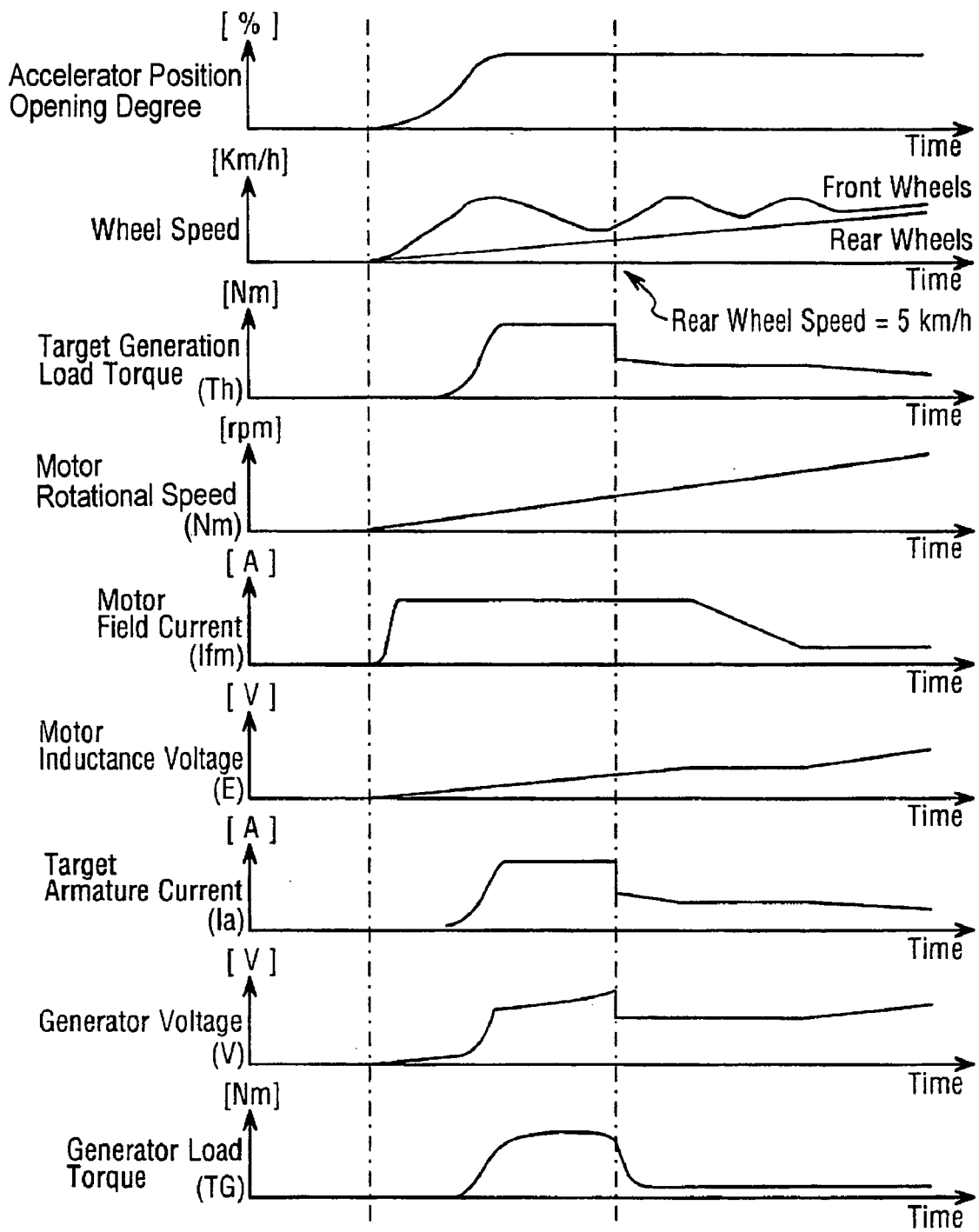
FIG. 15 are exemplary time charts for the surplus torque converting section for the vehicle driving force control apparatus of the first embodiment of the present invention.

FIG. 15 shows time charts for a case where the load torque of the generator 7 is output and controlled even in a low-speed state below a predetermined speed. The example is for a case in which the low-speed state below a predetermined speed is taken to be a rear wheel speed of less than 5 km/h.

The following explains the operation of the third target load torque computing section 62. In the third target load torque computing section 62, the second target generator load torque Th2 is computed in accordance with the control map shown in graph (a) of FIG. 7. For example, as shown by the chain link line shown in graph (b) of FIG. 7, the engine output torque Te increases linearly with the increase in the accelerator position opening degree, the second target generation load torque Th2 corresponds to the portion between the broken line and the chain link line (engine output torque Te) shown in graph (b) of FIG. 7, and the main drive torque ThF substantially applied to the front wheels 1L and 1R by the engine corresponds to the broken line. As discussed earlier, the engine torque, i.e., mechanical energy, is converted to electrical energy, which is then reconverted to motor torque, i.e., mechanical energy, and conversion losses arise therebetween. If the conversion efficiency during this time is considered to be fixed, the portion of the second target generation load torque Th2 that is the subordinate drive torque Th2R substantially applied to the rear wheels 3L and 3R by the electric motor 4 corresponds to the portion between the solid line and the broken line, and the portion between the solid line and the chain link line constitutes the loss Th2L. Accordingly, the overall vehicle drive torque Tt corresponds to the solid line.

Figure 16:
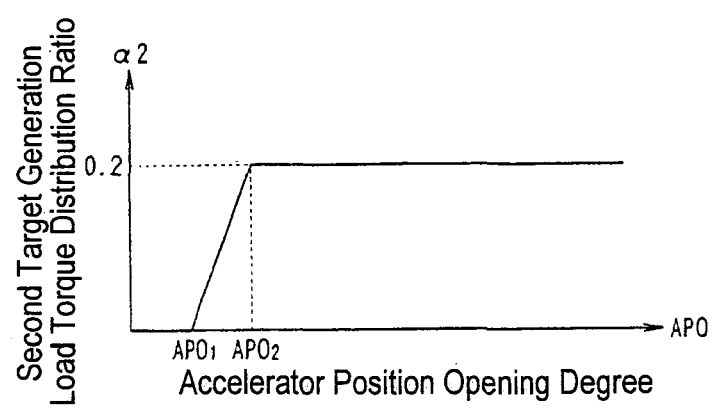
FIG. 16 shows a pair of graphs for a conventional method of setting the generator drive torque from an engine.
Figure 16:
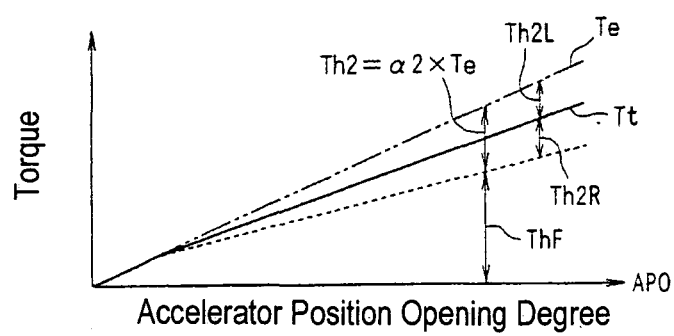

As shown in graph (a) of FIG. 16, if the second target generation load torque distribution ratio $\alpha 2$ is fixed at a predetermined ratio, e.g., 0.2, and in the range where the accelerator position opening degree APO is greater than or equal to a predetermined value $APO_2$, the loss Th2L increases linearly as the accelerator position opening degree APO increases, as shown in shown in graph (b) of FIG. 16, and, as shown by the solid line in the same figure, the overall vehicle drive torque Tt unfortunately becomes a small value, particularly in the range where the accelerator position opening degree APO is large.

Figure 7:
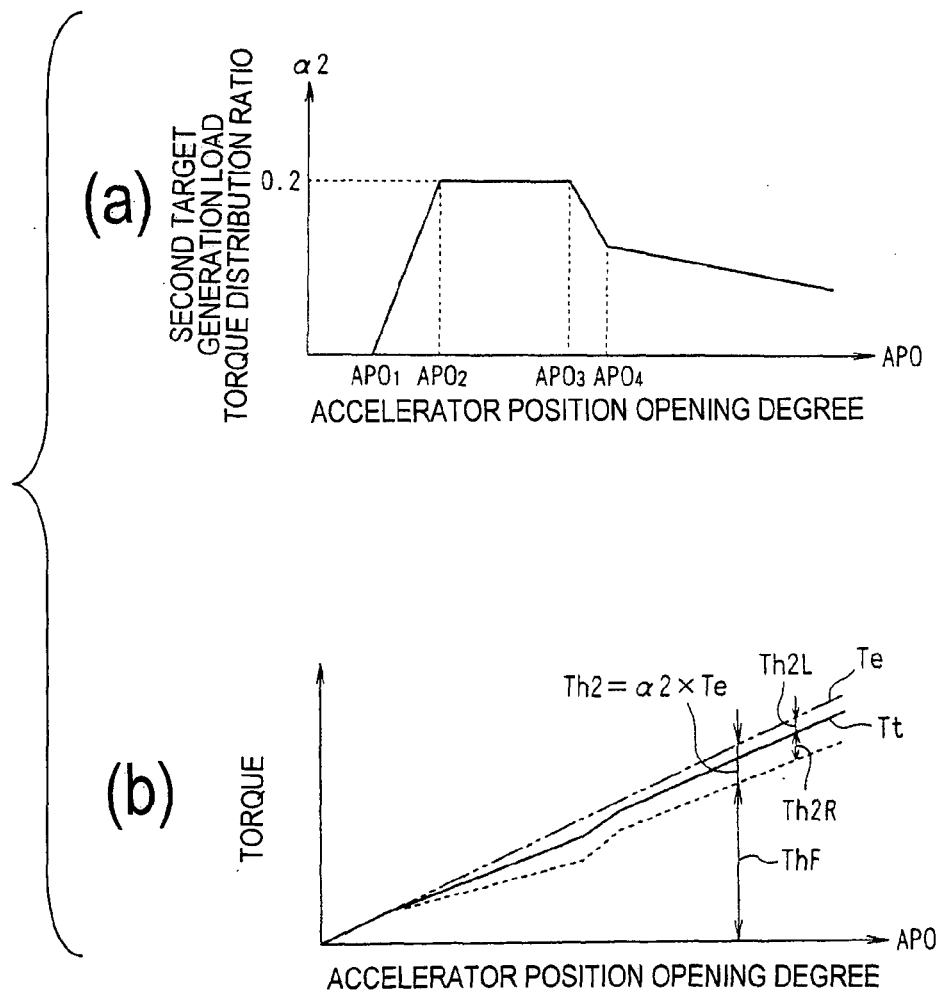
FIG. 7 shows a pair of graphs to explain the control map used in the computational processing executed by the surplus torque computing section of FIG. 5 for the vehicle driving force control apparatus of the first embodiment of the present invention.

In contrast, in the control map shown in graph (a) of FIG. 7, the larger the accelerator position opening degree APO in the range greater than or equal to the predetermined value $APO_3$, which indicates the ordinary range, the overall vehicle drive torque Tt shown in graph (b) of FIG. 7 is not that small because the second target generation load torque distribution ratio $\alpha 2$ is set small.

Figure 17:
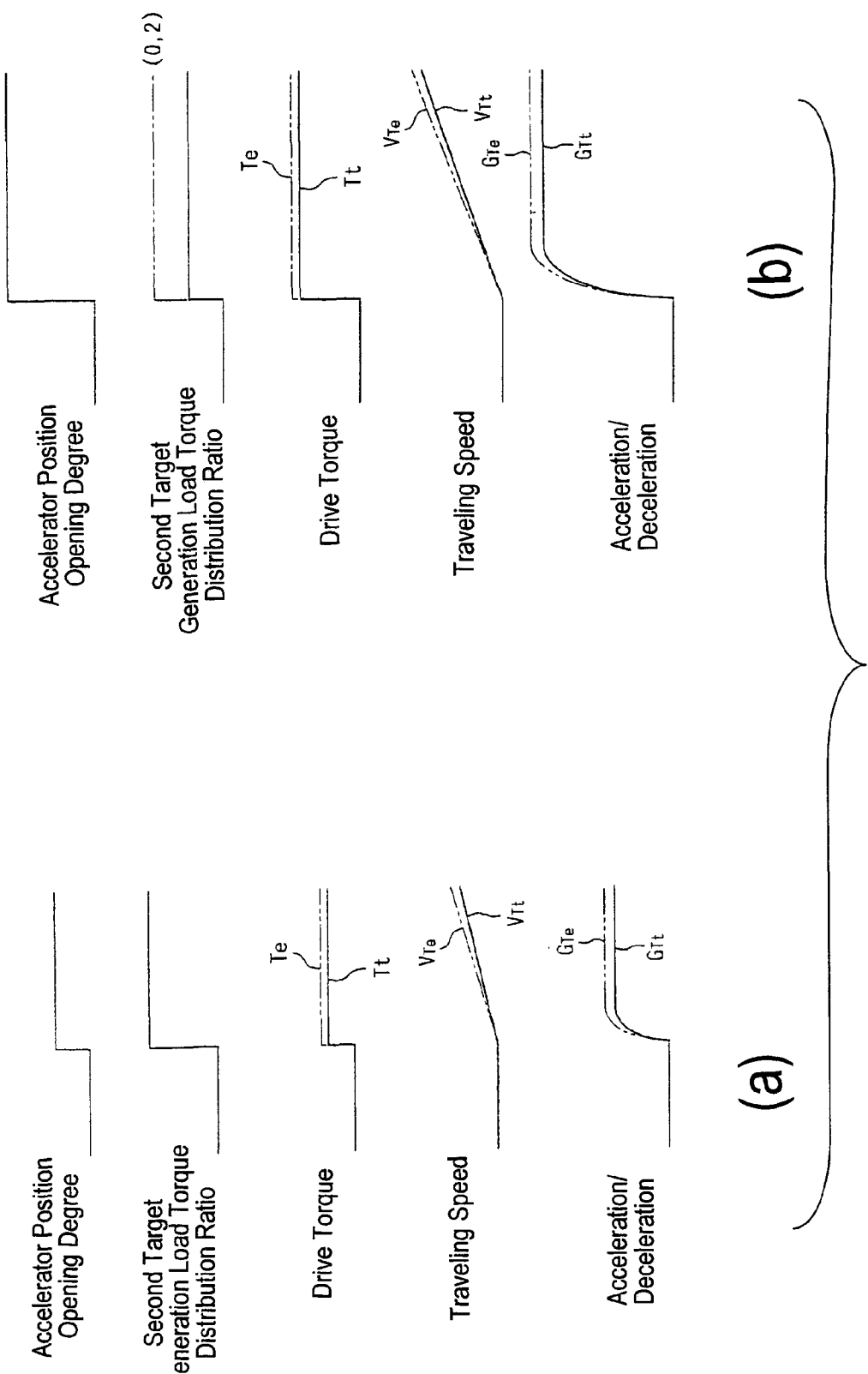
FIG. 17 are explanatory diagrams showing operational characteristics of a vehicle using the vehicle driving force control apparatus of the first embodiment of the present invention.

As shown in graph (a) of FIG. 17, the acceleration/deceleration GTt of the subject vehicle is illustrated when the accelerator pedal is slightly depressed from a released condition when traveling on a good road having a high coefficient of resistance. As shown in graph (b) of FIG. 17, the acceleration/deceleration GTt of the subject vehicle is illustrated when the accelerator pedal has likewise been depressed greatly. As described earlier, the second target generation load torque distribution ratio $\alpha 2$ is set small in the present embodiment in the range where the accelerator position opening degree is large. Therefore, as shown in graph (b) of FIG. 17, the overall vehicle drive torque Tt with respect to the engine output torque Te can be reduced less, and a reduction in the subject vehicle acceleration/deceleration GTt due to the overall vehicle drive torque Tt can be suppressed compared with the acceleration/deceleration GTe due to the engine output torque Te, thereby ensuring a sufficient acceleration performance.

Figure 18:
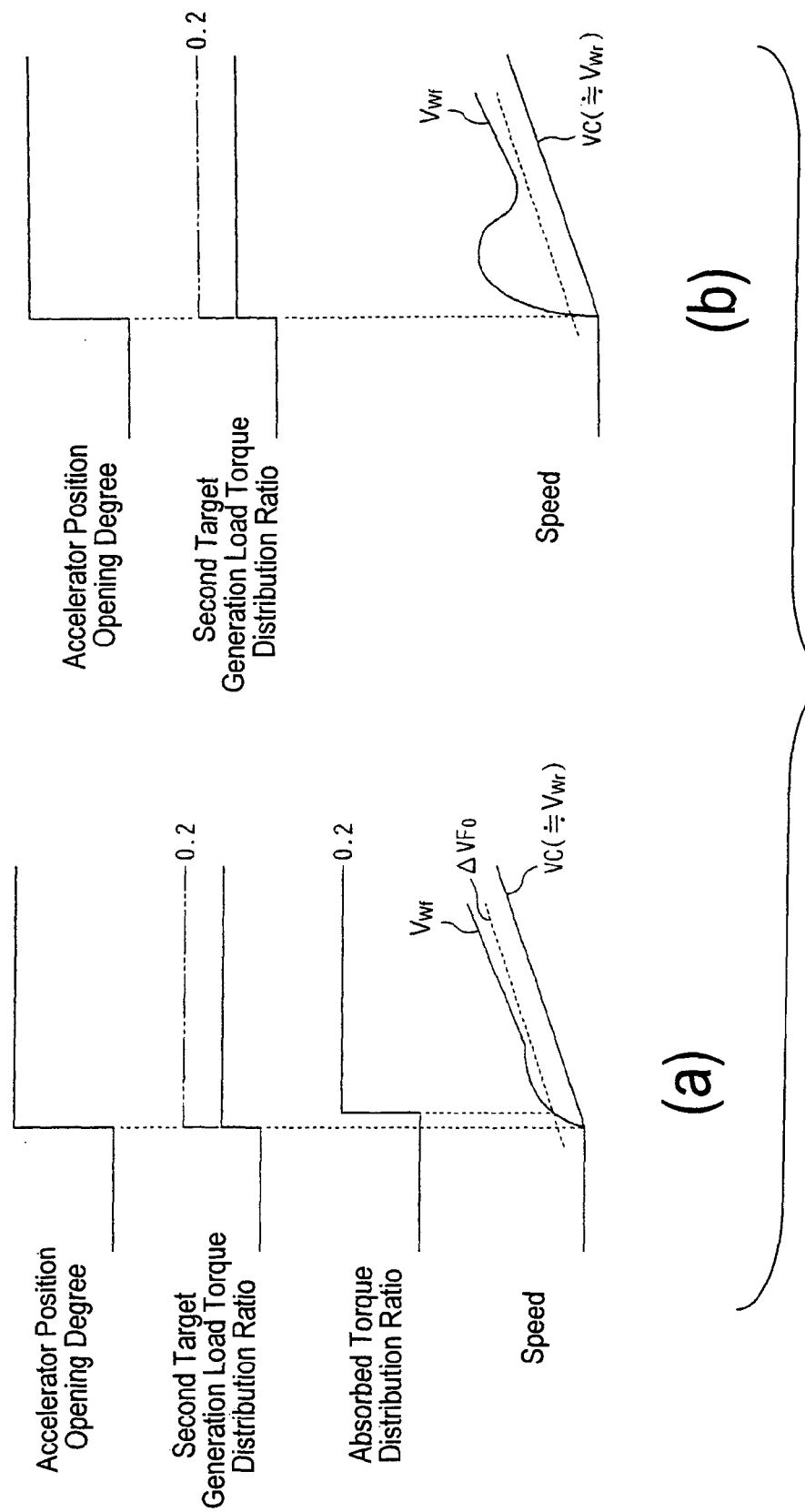
FIG. 18 are additional explanatory diagrams showing operational characteristics of a vehicle using the vehicle driving force control apparatus of the first embodiment of the present invention.

Moreover, the graph (a) of FIG. 18 shows the subject vehicle traveling speed VC and the average front wheel speed $V_{wf}$ (main drive wheels) for when the accelerator pedal is depressed greatly from a released state on a road surface having a low coefficient of friction. The subject vehicle traveling speed VC is substantially equivalent to the average rear wheel speed $V_{Wr}$ (subordinate drive wheels). As discussed earlier, the second target generation load torque distribution ratio α2 is set to a value smaller than a predetermined ratio of 0.2 when the accelerator position opening degree is large, which results in setting of the second target generation load torque Th2 to a small value. However, if, as in this simulation, the acceleration slippage $\Delta V_F$, between the average front wheel speed $V_{Wf}$ (main drive wheels) and the average rear wheel speed $V_{Wr}$ (subordinate drive wheels) when starting suddenly from a stop on a road surface having a low coefficient of friction, the absorbed torque distribution ratio α is set to a predetermined ratio of 0.2, which results in an increase in the absorbed torque $T\Delta V_F$. In the present embodiment, the larger of the second target generation load torque Th2 and the absorbed torque $T\Delta V_F$ is set as the ultimate target generation load torque Th. Therefore, in this case, the absorbed torque $T\Delta V_F$ is set as the ultimate target generator load torque Th, which results in a decrease in the main drive torque ThF from the engine, and a quicker convergence of the average front wheel speed $V_{Wf}$ (main drive wheels).

In contrast, the graph (b) of FIG. 18 shows the average front wheel speed $V_{Wf}$ (main drive wheels) and the subject vehicle traveling speed VC when the second target generation load torque Th2 is set, as is, as the ultimate target generation load torque Th without selecting the higher of the second target generation load torque Th2 and the absorbed torque $T\Delta V_F$. In this case, the second target generation load torque distribution ratio α2 is set to a value smaller than the predetermined ratio 0.2 in accordance with the large accelerator position opening degree, which results in a decrease in the value of the second target generation load torque Th2 Since that is set, as is, as the ultimate target generation load torque Th, the main drive torque ThF from the engine does not decrease, and the average front wheel speed $V_{Wf}$ (main drive wheels) does not easily converge.

Because the present embodiment is constituted so that the larger the accelerator position opening degree, which is the amount of acceleration demanded by the driver, the smaller the second target generation load torque Th2 is set, the vehicle acceleration performance can be ensured, even when the driver is demanding a larger acceleration. In addition, because the present embodiment is constituted so that the absorbed torque $T\Delta V_F$ is computed in accordance with the acceleration slippage ΔVF, and the ultimate target generation load torque Th is set to the larger of the absorbed torque $T\Delta V_F$ and the second target generation load torque Th2 stability when starting from a stop can be ensured even on a road surface having a low coefficient of friction.

Second Embodiment

Figure 19:
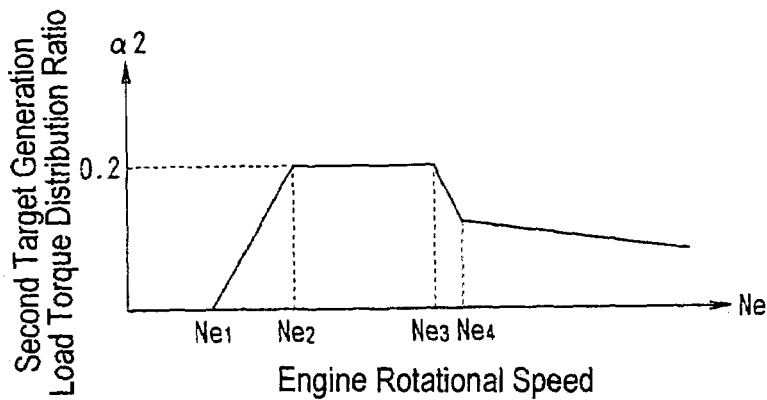
FIG. 19 is a control map used in the computational processing executed by the surplus torque computing section of FIG. 5 for the vehicle driving force control apparatus of a second embodiment of the present invention.

Referring now to FIG. 19, a vehicle driving force control apparatus of a four-wheel drive vehicle in accordance with a second embodiment will now be explained. In the second embodiment, the control map of the second target generation load torque distribution ratio α2 for computing the second target generation load torque Th2 is modified from the one shown in FIG. 7 (first embodiment) to the one shown in FIG. 19. Otherwise, the descriptions of the first embodiment apply to this embodiment. Thus, the descriptions of the parts of the second embodiment that are identical to the parts of the first embodiment have been omitted for the sake of brevity.

The control input in this control map of FIG. 19 is modified to be based on the engine rotational speed Ne, instead of the accelerator position opening degree APO. Namely, the engine rotational speed Ne, which varies nearly linearly in accordance with the accelerator position opening degree APO, is detected as the amount of acceleration demanded by the driver, and the second target generation load torque distribution ratio α2 is set in accordance with the engine rotational speed Ne. Furthermore, the predetermined value $Ne_1$ in the control map corresponds to the predetermined value $APO_1$ of the accelerator position opening degree APO, and the predetermined value $Ne_2$, the predetermined value $Ne_3$, and the predetermined value $Ne_4$, respectively, correspond to the predetermined value $APO_2$, the predetermined value $APO_3$, and the predetermined value $APO_4$.

Third Embodiment

Figure 20:
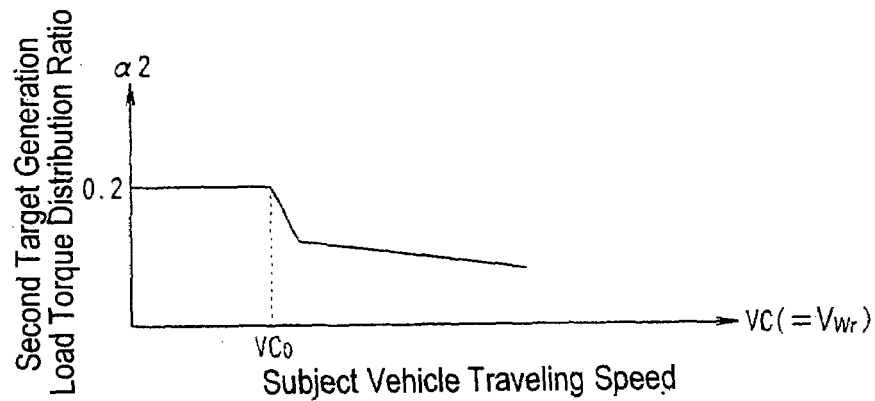
FIG. 20 is a control map used in the computational processing executed by the surplus torque computing section of FIG. 5 for the vehicle driving force control apparatus of a third embodiment of the present invention.

Referring now to FIG. 20, a vehicle driving force control apparatus of a four-wheel drive vehicle in accordance with a third embodiment will now be explained. In the third embodiment, the control map of the second target generation load torque distribution ratio α2 for computing the second target generation load torque Th2 is modified from the one shown in FIG. 7 (first embodiment) to the one shown in FIG. 20. Otherwise, the descriptions of the first embodiment apply to this embodiment. Thus, the descriptions of the parts of the third embodiment that are identical to the parts of the first embodiment have been omitted for the sake of brevity.

In this control map, the control input is the subject vehicle traveling speed VC or the average rear wheel speed $V_{Wr}$ equivalent thereto, and the second target generation load torque distribution ratio α2 is set in accordance with the subject vehicle traveling speed VC. In this control map, the extremely low speed regarded as starting from a stop is the predetermined value $VC_0$; in the range where the subject vehicle traveling speed VC is less than the predetermined value $VC_0$, the second target generation load torque distribution ratio α2 is set to the fixed predetermined ratio 0.2, representing the condition in which starting from a stop is not yet completed; and in the range where the subject vehicle traveling speed VC is greater than or equal to the predetermined value $VC_0$, the second target generation load torque distribution ratio α2 is set increasingly smaller as the subject vehicle traveling speed VC increases, representing the condition in which starting from a stop has completed. Accordingly, the larger the subject vehicle traveling speed VC when the subject vehicle traveling speed VC is greater than or equal to the speed at which starting from a stop has completed, the smaller the second target generation load torque Th2 is set. In other words, in FIG. 20, the range after the point at which starting from a stop is regarded to be completed would be considered good road, namely, a road having a surface with a high coefficient of friction. Therefore, as explained in the first embodiment, the second target generation load torque Th2 is set to a small value to ensure acceleration performance on good roads.

Fourth Embodiment

Figure 21:
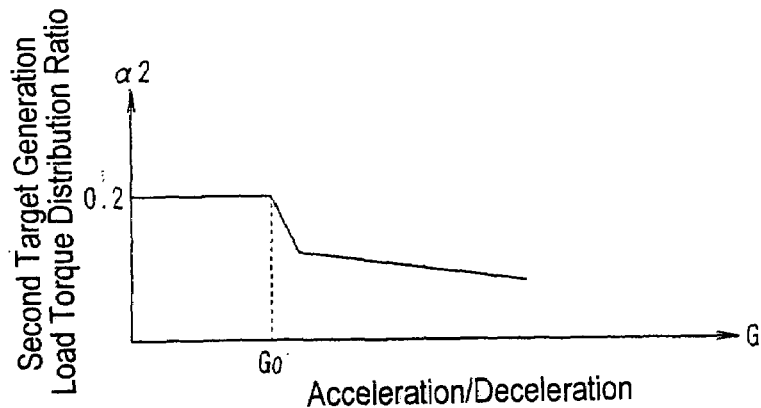
FIG. 21 is a control map used in the computational processing executed by the surplus torque computing section of FIG. 5 for the vehicle driving force control apparatus of a fourth embodiment of the present invention.

Referring now to FIG. 21, a vehicle driving force control apparatus of a four-wheel drive vehicle in accordance with a fourth embodiment will now be explained. In the fourth embodiment, the control map of the second target generation load torque distribution ratio α2 for computing the second target generation load torque Th2 is modified from the one shown in FIG. 7 (first embodiment) to the one shown in FIG. 21. Otherwise, the descriptions of the first embodiment apply to this embodiment. Thus, the descriptions of the parts of the fourth embodiment that are identical to the parts of the first embodiment have been omitted for the sake of brevity.

In this control map, the control input is an acceleration/deceleration force G of the subject vehicle, and the second target generation load torque distribution ratio α2 is set in accordance with the acceleration/deceleration force G of the subject vehicle. The acceleration/deceleration force G of the subject vehicle is not only the result of the acceleration demanded by the driver, but also the criteria for determining the road surface coefficient of friction. For example, if the predetermined value $G_0$ is approximately 0.3 g (where g is the acceleration of gravity), then acceleration is demanded by the driver in the range greater than or equal to the predetermined value $G_0$. Moreover, since a road having a high road surface coefficient of friction is considered a good road, the second target generation load torque distribution ratio α2 is fixed to a predetermined ratio of 0.2 in the range where the acceleration/deceleration force G of the subject vehicle is less than the predetermined value $G_0$. In the range greater than or equal to the predetermined value $G_0$, the second target generation load torque distribution ratio α2 is set increasingly small as the acceleration/deceleration force G of the subject vehicle increases. Accordingly, the larger the acceleration/deceleration force G of the subject vehicle, the smaller the second target generation load torque Th2 is set. Further, the larger the amount of acceleration demanded by the driver, the more the reduction in the overall vehicle drive torque is suppressed, thereby maintaining the acceleration performance.

Fifth Embodiment

Figure 22:
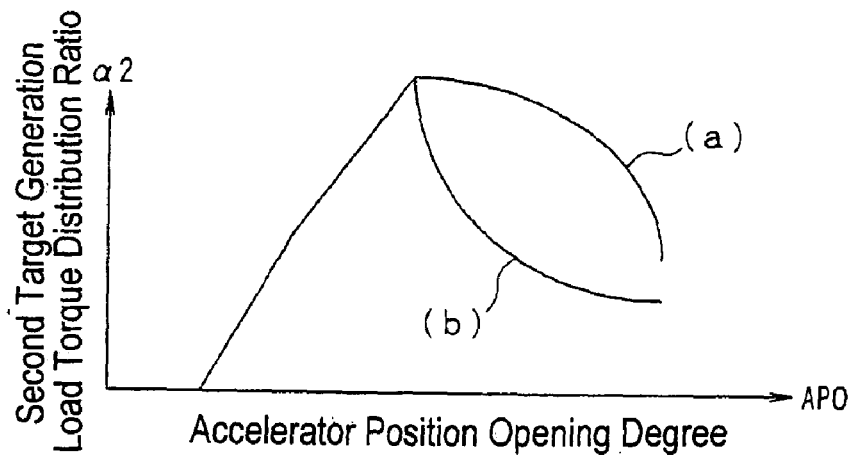
FIG. 22 is a control map used in the computational processing executed by the surplus torque computing section of FIG. 5 for the vehicle driving force control apparatus of a fifth embodiment of the present invention.

Referring now to FIG. 22, a vehicle driving force control apparatus of a four-wheel drive vehicle in accordance with a fifth embodiment will now be explained. In the fifth embodiment, the control map of the second target generation load torque distribution ratio α2 for computing the second target generation load torque Th2 is modified from the one shown in FIG. 7 (first embodiment) to the one shown in FIG. 22. Otherwise, the descriptions of the first embodiment apply to this embodiment. Thus, the descriptions of the parts of the fifth embodiment that are identical to the parts of the first embodiment have been omitted for the sake of brevity.

In this control map, the control input is the accelerator position opening degree APO, as in the first embodiment, but the setting characteristics of the second target generation load torque distribution ratio α2 differ. Namely, the range in which the second target generation load torque distribution ratio α2 is limited to a fixed value is eliminated; a curve (a) represents the situation in which the second target generation load torque distribution ratio α2 decreases sharply in the range where the accelerator position opening degree APO is large; and a curve (b) represents the situation in which the second target generation load torque distribution ratio α2 decreases sharply in the range where the accelerator position opening degree APO is of medium value. The decreasing trend in the second target generation load torque distribution ratio α2 corresponds to the decreasing trend of the second target generation load torque Th2 and, at the same time, also corresponds to the trend in suppressing the reduction of the subject vehicle overall drive torque. For example, in the curve (a), acceleration increases sharply in the range in which the accelerator position opening degree APO is large. The curve (b) illustrates a trend in which the acceleration increases sharply in the range in which the accelerator position opening degree APO is of an intermediate value. Namely, the acceleration feeling can be tuned by adjusting the second target generation load torque distribution ratio α2 or the second target generation load torque Th2 i.e., the setting characteristics of the generator drive torque from the engine. In addition, there is no need to limit the generator drive torque from the engine, as in the present embodiment, if the capacity of the generator 7 and electric motor 4 are sufficient.

Sixth Embodiment

Figure 23:
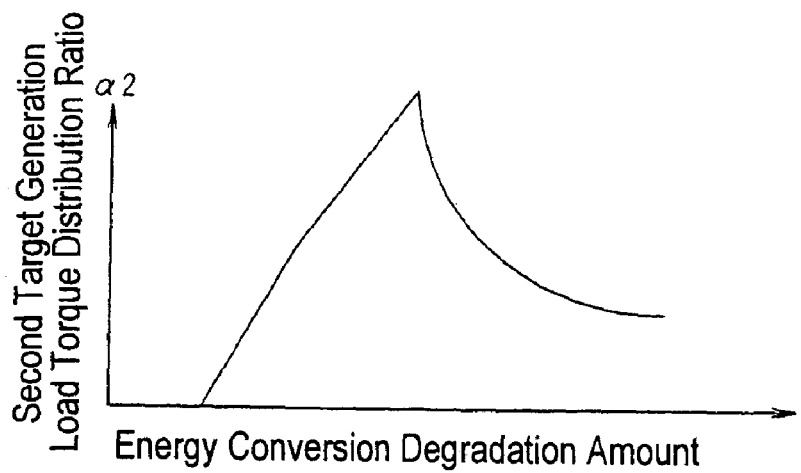
FIG. 23 is a control map used in the computational processing executed by the surplus torque computing section of FIG. 5 for the vehicle driving force control apparatus of a sixth embodiment of the present invention.

Referring now to FIG. 23, a vehicle driving force control apparatus of a four-wheel drive vehicle in accordance with a sixth embodiment will now be explained. In the sixth embodiment, the control map of the second target generation load torque distribution ratio α2 for computing the second target generation load torque Th2 is modified from the one shown in FIG. 7 according to the first embodiment to the one shown in FIG. 23. Otherwise, the descriptions of the first embodiment apply to this embodiment. Thus, the descriptions of the parts of the sixth embodiment that are identical to the parts of the first embodiment have been omitted for the sake of brevity.

In this control map, the control input is the energy conversion degradation amount (absolute value), i.e., the amount of loss. The energy conversion degradation amount is the amount of energy lost when converting from mechanical energy to electrical energy, and then back to mechanical energy, as discussed earlier. For example, in a case in which the energy conversion efficiency is fixed, and the second target generation load torque distribution ratio α2 is fixed, the larger the engine output, the larger the generator drive torque, and the larger the absolute value of the conversion loss Th2L, i.e., the energy conversion degradation amount. Accordingly, the energy conversion degradation amount of the engine output distributed to the generator drive torque is computed, and an increase in that energy conversion degradation amount is felt as insufficient acceleration power. Accordingly, in the present embodiment, in the range where the energy conversion degradation amount is large, the value of the second target generation load torque distribution ratio α2 is set increasingly smaller as the energy conversion degradation amount increases. Thereby, the larger the amount of acceleration demanded by the driver, the more the reduction in the overall vehicle drive torque is suppressed, and acceleration performance can thereby be maintained.

Furthermore, the present embodiment describes a means of limiting the output of an internal combustion engine by throttle control, but is not limited thereto. Any one of the following methods for limiting the output of an internal combustion engine is acceptable: retarding ignition timing, cutting off ignition, reducing or stopping the flow of fuel, and controlling the throttle.

In addition, the present embodiment describes an example of a case in which the vehicle is capable of four-wheel drive, but the present embodiment may also be applied to a vehicle provided with two or more wheels, wherein a portion of the wheels are driven by an internal combustion engine, and another portion or all of the remaining wheels are driven by an electric motor.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-247551. The entire disclosure of Japanese Patent Application No. 2002-247551 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus comprising:
    a drive source configured to drive a main drive wheel;
    a generator operatively coupled to the drive source so that the generator is driven by the drive source;
    an electric motor operatively coupled to the generator, and configured to drive an electric motor driven wheel by electricity from the generator;
    a driving force detection section configured to detect a requested acceleration amount; and
    a driving force control section configured to set a target generator driving force from the drive source based on the requested acceleration amount detected by the driving force detection section and to reduce the target generator driving force from the drive source in response to the requested acceleration amount detected by the driving force detection section exceeding a predetermined amount.

2. The vehicle driving force control apparatus as recited in claim 1, wherein
    the driving force control section is further configured to further reduce the target generator driving force from the drive source as the requested acceleration amount detected by the driving force detection section becomes larger after exceeding the predetermined amount.

3. The vehicle driving force control apparatus as recited in claim 1, wherein
    the driving force control section is further configured to set a fixed amount for the target generator driving force from the drive source as the requested acceleration amount detected by the driving force detection section become larger in a range prior to reaching the predetermined amount.

4. The vehicle driving force control apparatus as recited in claim 3, wherein
    the driving force control section is further configured to increase the target generator driving force from the drive source as the requested acceleration amount detected by the driving force detection section become larger prior to reaching the range in which the fixed amount for the target generator driving force from the drive source is used.

5. The vehicle driving force control apparatus as recited in claim 2, further comprising
    a motor control section configured to increase a rotational speed of the electric motor by reducing a field current of the electric motor once an armature voltage of the electric motor is reached.

6. The vehicle driving force control apparatus as recited in claim 1, wherein
    the generator is driven by an internal combustion engine of the drive source.

7. A vehicle driving force control apparatus for a vehicle having a drive source configured to drive a generator and an electric motor configured to drive an electric motor driven wheel by electricity from the generator, the vehicle driving force control apparatus comprising:
    a driving force detection section configured to detect at least one of a requested acceleration amount and a vehicle traveling speed of the vehicle; and
    a driving force control section configured to set a target generator driving force from the drive source based on the at least one of the requested acceleration amount and the vehicle traveling speed of the vehicle detected by the driving force detection section,
    the driving force detection section being an acceleration demand amount detection section configured to detect the requested acceleration amount,
    the driving force control section being further configured to set the target generator driving force from the drive source based on the requested acceleration amount detected by the acceleration demand amount detection section,
    the driving force control section comprising an acceleration slippage detection section configured to detect an amount of acceleration slip of a wheel that is not driven by the electric motor, and an acceleration slip target generator driving force computing section configured to compute an acceleration slip target generator driving force from the drive source, based on the amount of acceleration slip detected by the acceleration slippage detection section,
    the driving force control section being configured to set the acceleration slip target generator driving force computed by the acceleration slip target generator driving force computing section as the target generator driving force from the drive source, upon determining the acceleration slip target generator driving force to be larger than the target generator driving force from the drive source set based on the requested acceleration amount.

8. A vehicle driving force control apparatus for a vehicle having a drive source configured to drive a generator and an electric motor configured to drive an electric motor driven wheel by electricity from the generator, the vehicle driving force control apparatus comprising:
    a driving force detection section configured to detect at least one of a requested acceleration amount and a vehicle traveling speed of the vehicle; and a driving force control section configured to set a target generator driving force from the drive source based on the at least one of the requested acceleration amount and the vehicle traveling speed of the vehicle detected by the driving force detection section, the driving force detection section being an acceleration demand amount detection section configured to detect the requested acceleration amount, the driving force control section being further configured to set the target generator driving force from the drive source based on the requested acceleration amount detected by the acceleration demand amount detection section, the driving force control section being further configured to reduce the target generator driving force from the drive source as the requested acceleration amount becomes larger, when the requested acceleration amount detected by the acceleration demand amount detection section is larger than a predetermined requested acceleration amount, the driving force control section comprises an acceleration slippage detection section configured to detect an amount of acceleration slip of a wheel that is not driven by the electric motor, and an acceleration slip target generator driving force computing section configured to compute an acceleration slip target generator driving force from the drive source, based on the amount of acceleration slip detected by the acceleration slippage detection section; and the vehicle driving force control section is configured to set the acceleration slip target generator driving force computed by the acceleration slip target generator driving force computing section as the target generator driving force from the drive source, upon determining the acceleration slip target generator driving force to be larger than the target generator driving force from the drive source set based on the requested acceleration amount.

9. A vehicle driving force control apparatus for a vehicle having a drive source configured to drive a generator and an electric motor configured to drive an electric motor driven wheel by electricity from the generator, the vehicle driving force control apparatus comprising:

a driving force detection section configured to detect at least one of a requested acceleration amount and a vehicle traveling speed of the vehicle; and a driving force control section configured to set a target generator driving force from the drive source based on the at least one of the requested acceleration amount and the vehicle traveling speed of the vehicle detected by the driving force detection section, the driving force detection section being a traveling speed detection section configured to detect the vehicle traveling speed, the driving force control section being configured to set the target generator driving force from the drive source based on the vehicle traveling speed detected by the traveling speed detection section, the driving force control section comprising an acceleration slippage detection section configured to detect an amount of acceleration slip of a wheel that is not driven by the electric motor, and an acceleration slip target generator driving force computing section configured to compute an acceleration slip target generator driving force from the drive source, based on the amount of acceleration slip detected by the acceleration slippage detection section, the driving force control section being configured to set the acceleration slip target generator driving force computed by the acceleration slip target generator driving force computing section as the target generator driving force from the drive source, upon determining the acceleration slip target generator driving force to be larger than the target generator driving force from the drive source set based on the vehicle traveling speed.

10. A vehicle driving force control apparatus for a vehicle having a drive source configured to drive a generator and an electric motor configured to drive an electric motor driven wheel by electricity from the generator, the vehicle driving force control apparatus comprising:

a driving force detection section configured to detect at least one of a requested acceleration amount and a vehicle traveling speed of the vehicle; and a driving force control section configured to set a target generator driving force from the drive source based on the at least one of the requested acceleration amount and the vehicle traveling speed of the vehicle detected by the driving force detection section, the driving force detection section being a traveling speed detection section configured to detect the vehicle traveling speed, the driving force control section being configured to set the target generator driving force from the drive source based on the vehicle traveling speed detected by the traveling speed detection section, the driving force control section being further configured to reduce the target generator driving force from the drive source as the vehicle traveling speed detected by the traveling speed detection section increases, when the vehicle traveling speed detected by the traveling speed detection section is greater than a predetermined low-speed, the driving force control section comprising an acceleration slippage detection section configured to detect an amount of acceleration slip of a wheel that is not driven by the electric motor, and an acceleration slip target generator driving force computing section configured to compute an acceleration slip target generator driving force from the drive source, based on the amount of acceleration slip detected by the acceleration slippage detection section, the driving force control section being configured to set the acceleration slip target generator driving force computed by the acceleration slip target generator driving force computing section as the target generator driving force from the drive source, upon determining the acceleration slip target generator driving force to be larger than the target generator driving force from the drive source set based on the vehicle traveling speed.

11. A vehicle driving force control apparatus for a vehicle comprising:

main drive wheel driving means for driving a main drive wheel;

electric motor driven wheel driving means for driving an electric motor driven wheel;

electricity generating means for supplying electricity to the electric motor driven wheel driving means by generating the electricity by a drive force from the main drive wheel driving means;

driving force detection means for detecting a requested acceleration amount; and driving force control means for setting a target generator driving force from the main drive wheel driving means based on the requested acceleration amount detected by the driving force detection means, the driving force control means being further configured to reduce the target generator driving force from the main drive wheel driving means in response to the requested acceleration amount detected by the driving force detection means exceeding a predetermined amount.

12. The vehicle driving force control apparatus as recited in claim 11, wherein the driving force detection means is further configured to reduce the target generator driving force from the main drive wheel driving means as the requested acceleration amount detected by the driving force detection means becomes larger after exceeding the predetermined amount.

13. A method of controlling a vehicle comprising:

providing a drive source configured to drive a main drive wheel and a generator, and an electric motor configured to drive an electric motor driven wheel by electricity from the generator;

detecting a requested acceleration amount;

setting a target generator driving force from the drive source based on detection of the requested acceleration amount; and reducing the target generator driving force from the drive source in response to the requested acceleration amount detected exceeding a predetermined amount.

14. The method as recited in claim 13, further comprising further reducing the target generator driving force from the drive source as the requested acceleration amount detected becomes larger after exceeding the predetermined amount.

* * * * *